United States Patent [19]
Beauchamp et al.

[11] Patent Number: 5,975,674
[45] Date of Patent: *Nov. 2, 1999

[54] OPTICAL PATH OPTIMIZATION FOR LIGHT TRANSMISSION AND REFLECTION IN A CARRIAGE-MOUNTED INKJET PRINTER SENSOR

[75] Inventors: Robert W. Beauchamp, Carlsbad, Calif.; Isidre Rosello Martos, Victor Catala; Josep Tarradas, Mosen Reixach, both of Spain

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/551,022

[22] Filed: Oct. 31, 1995

Related U.S. Application Data

[63] Continuation-in-part of application No. 08/153,712, Nov. 16, 1993, abandoned, and a continuation-in-part of application No. 08/540,908, Oct. 11, 1995, Pat. No. 5,600,350, which is a continuation of application No. 08/055,624, Apr. 30, 1993, abandoned, said application No. 08/153,712, Nov. 16, 1993, is a division of application No. 07/763,889, Sep. 20, 1991, Pat. No. 5,262,797, which is a continuation-in-part of application No. 07/504,437, Apr. 4, 1990, abandoned.

[51] Int. Cl.⁶ ................................................. B41J 29/393
[52] U.S. Cl. ............................................... 347/19; 356/402
[58] Field of Search ................................. 347/19, 37, 40, 347/43; 356/372, 402, 445, 448; 250/236, 208.2, 578.1

[56] References Cited

U.S. PATENT DOCUMENTS

| | | | |
|---|---|---|---|
| 3,393,602 | 7/1968 | Stouffer | 88/14 |
| 4,435,674 | 3/1984 | Hevenor et al. | 318/640 |
| 4,471,384 | 9/1984 | Sato et al. | 358/282 |
| 4,839,722 | 6/1989 | Barry et al. | 358/80 |
| 4,916,638 | 4/1990 | Haselby et al. | 364/519 |
| 5,262,797 | 11/1993 | Boeller et al. | 346/1.1 |
| 5,404,020 | 4/1995 | Cobbs | 250/548 |
| 5,596,353 | 1/1997 | Takada et al. | 347/19 |

Primary Examiner—Safet Metjahic
Assistant Examiner—John Chizmar
Attorney, Agent, or Firm—David S. Romney

[57] ABSTRACT

Light emitted from an obliquely angled LED source is directed by peripheral light tube walls which extend vertically toward media displaying printed indicia. The emitted light provides an illuminated area surrounding the printed indicia, while the light tube walls shield the printed indicia from excessive external light, so that a sensor measures the intensity of emitted light directly reflected from the media through a protective aperture.

27 Claims, 25 Drawing Sheets

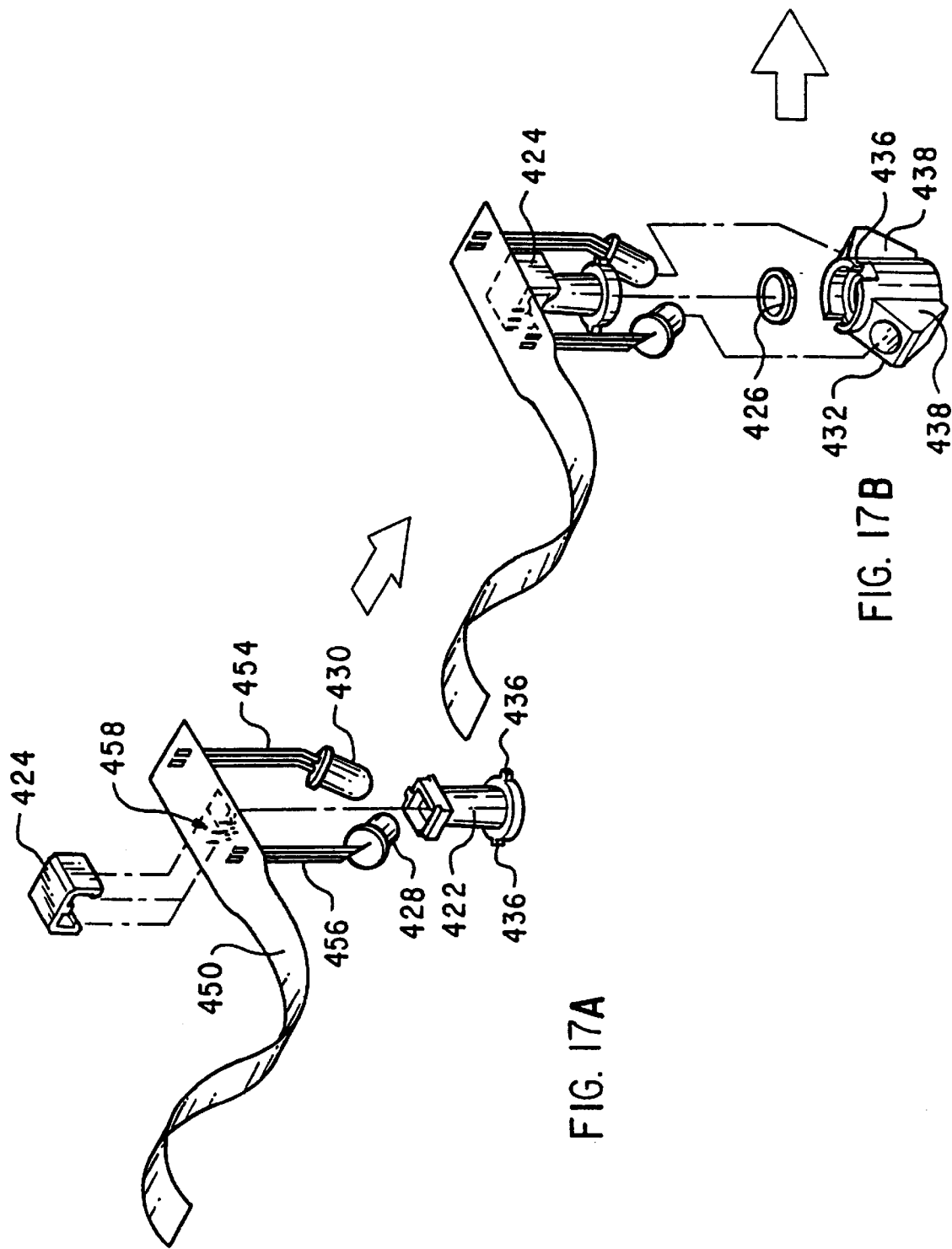

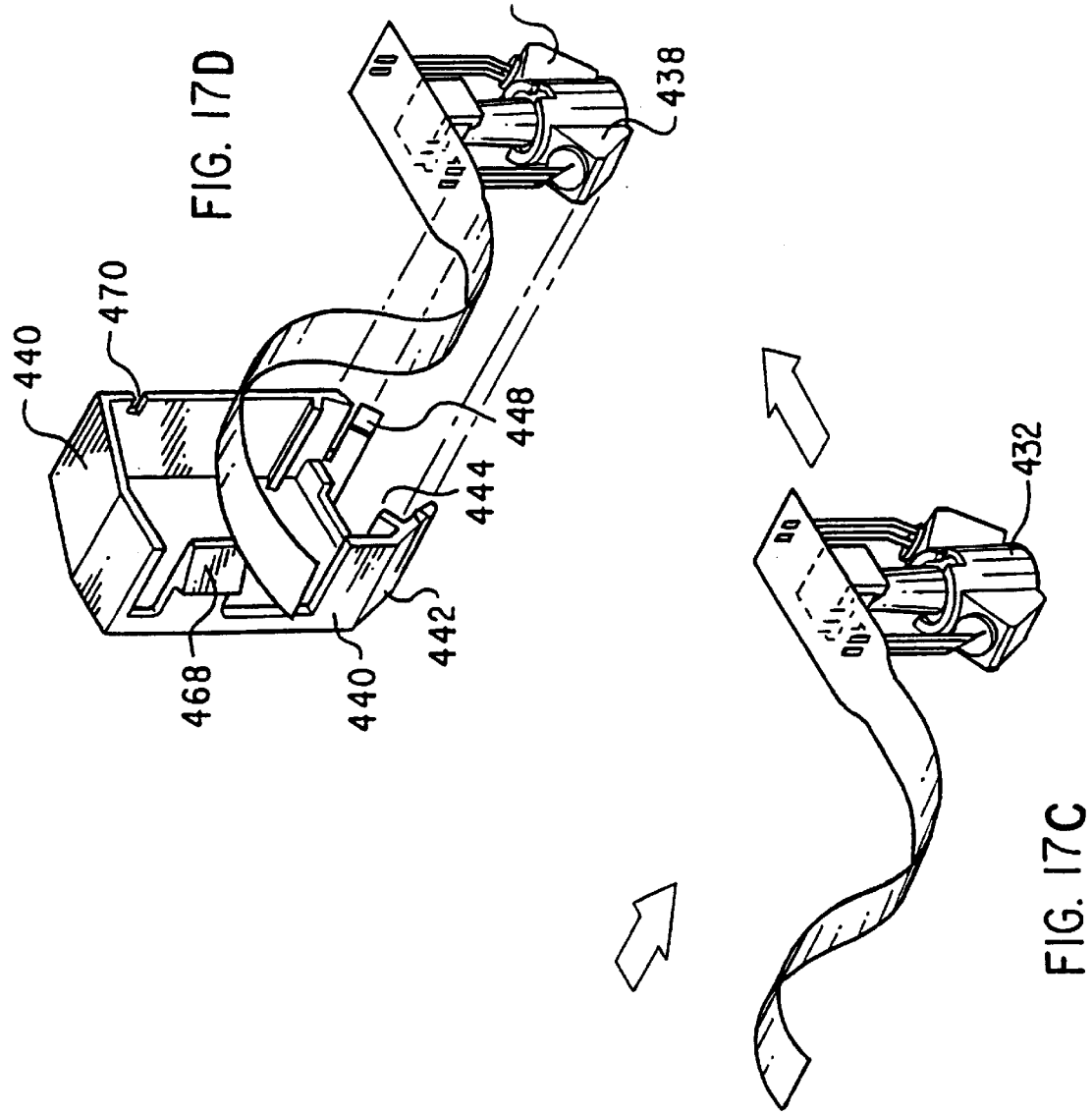

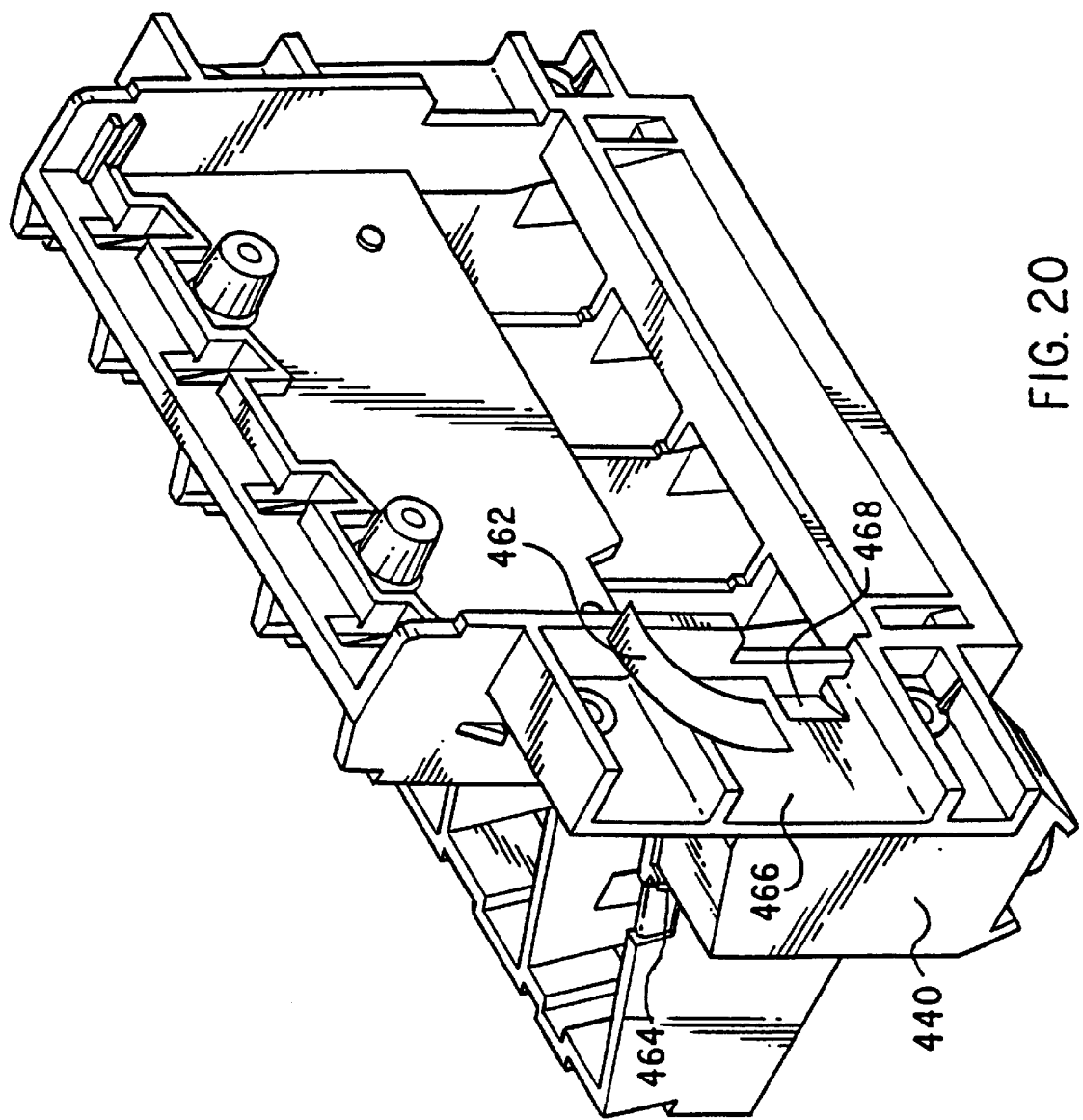

|  | Raw Data | | | | Calc. Data | | |
|---|---|---|---|---|---|---|---|
| Dist. Cap | x | Vw | Vmin | Vdk | Vw−Vdk | Vm−Vdk | PCR |
| 0.85 | 10.5 | 215 | 187 | 84 | 0.655 | 0.515 | 0.2137 |
| 1.35 | 10.0 | 215 | 186 | 84 | 0.655 | 0.510 | 0.2214 |
| 1.85 | 9.5 | 213 | 183 | 84 | 0.645 | 0.495 | 0.2326 |
| 2.35 | 9.0 | 209 | 181 | 84 | 0.625 | 0.485 | 0.2240 |
| 2.85 | 8.5 | 205 | 178 | 84 | 0.605 | 0.470 | 0.2231 |
| 3.35 | 8.0 | 202 | 175 | 84 | 0.590 | 0.455 | 0.2288 |
| mm | mm | Vcnts | Vcnts | Vcnts | mV | mV | − |

FIG.26

OPTICAL PATH OPTIMIZATION FOR LIGHT TRANSMISSION AND REFLECTION IN A CARRIAGE-MOUNTED INKJET PRINTER SENSOR

RELATED APPLICATIONS

This is a continuation-in-part of commonly assigned co-pending application Ser. No. 08/153,712 entitled OPTICAL SENSING OF SAMPLE COLOR MARKINGS ON MEDIA IN A CARRIAGE-TYPE GRAPHICAL WRITING SYSTEM filed Nov. 16, 1993, now abandoned, in the names of Messrs. Beauchamp, Rosello, Tarradas, Halpenny & Boeller, which is a divisional of commonly assigned co-pending application Ser. No. 07/763,889 entitled MONITORING AND CONTROLLING QUALITY OF PEN MARKINGS ON PLOTTING MEDIA filed Sep. 20, 1991, now U.S. Pat. No. 5,262,797, in the names of Messrs. Boeller, Halpenny, Tarradas, Rosello & Beauchamp, which is a continuation-in-part of commonly assigned previously pending Ser. No. 07/504,437 entitled WRITING SYSTEM FOR AND METHOD OF PRODUCING VISIBLE MARKINGS ON A MEDIUM filed Apr. 4, 1990, now abandoned, in the names of Messrs. Boeller, Halpenny, Tarradas & Rosello, all of which applications are incorporated herein by reference.

This is also a continuation-in-part of commonly assigned co-pending application Ser. No. 08/540,908, entitled MULTIPLE INKJET PRINT CARTRIDGE ALIGNMENT BY SCANNING A REFERENCE PATTERN AND SAMPLING SAME WITH REFERENCE TO A POSITION ENCODER filed Oct. 11, 1995, now U.S. Pat. No. 5,600,350, in the names of Messrs. Cobbs, Beauchamp & Sorenson, which is a continuation of co-pending application Ser. No. 08/055,624 entitled MULTIPLE INKJET PRINT CARTRIDGE ALIGNMENT BY SCANNING A REFERENCE PATTERN AND SAMPLING SAME WITH REFERENCE TO A POSITION ENCODER filed Apr. 30, 1993, abandoned, in the names of Messrs. Cobbs, Beauchamp & Sorenson, which applications are incorporated herein by reference.

Two other related commonly assigned co-pending applications are Ser. No. 08/551,297 entitled COMPACT FLEX-CIRCUIT FOR MODULAR ASSEMBLY OF OPTICAL SENSOR COMPONENTS IN AN INKJET PRINTER filed Oct. 31, 1995 in the name of Robert W. Beauchamp, and Ser. No. 08/558,571 entitled UNITARY LIGHT TUBE FOR MOUNTING OPTICAL SENSOR COMPONENTS ON AN INKJET PRINTER CARRIAGE filed Oct. 31, 1995 in the name of Robert W. Beauchamp, which applications are incorporated herein by reference.

BACKGROUND OF THE INVENTION

This invention relates generally to plotters, and more specifically to monitoring and controlling the quality of markings on plotting media.

A typical plotter comprises a pen for producing markings on a medium in response to instructions from, for example, a computer. The medium such as paper is movable in a first direction along the X-axis and the pen on a main carriage is movable in a second direction along the Y-axis which is perpendicular to the first direction. Thus, by appropriate control of the drives for the pen and paper movement, any desired graphical representation can be produced on the medium. The writing system also typically comprises a plurality of pens, for example pens of different colors. A pen handling mechanism is provided which permits a pen to move into position on the carriage for plotting on the medium and replaces that pen by another one, for example when a different color is desired.

Writing systems such as the above-mentioned pen plotter are typically used for producing rather complex graphical representations, for example circuit layouts or construction diagrams, which are electronically stored in a computer on which they may also have been created by a user. Once the plotting of those electronically stored drawings has been initiated by a user, the plotting continues automatically and the user only has to take the completed drawing from the plotter. In practice, however, the completed drawings have not always been satisfactory. As a consequence thereof, the entire drawing generally had to be plotted again.

Thus, a considerable amount of time is wasted and the efficiency of the plotting is decreased. Usually these problems are resolved by perfecting the components of the plotter.

Despite such attempts for perfection of the writing components, writing failures may still occur.

More recently, the full color inkjet printer/plotters which have been developed comprise a plurality of inkjet pens of diverse colors. A typical color inkjet printer/plotter has four inkjet pens, one that stores black ink, and three that store colored inks, e.g., magenta, cyan and yellow. The colors from the three color pens are mixed to obtain any particular color.

The pens are typically mounted in stalls within an assembly which is mounted on the carriage of the printer/plotter. The carriage assembly positions the inkjet pens and typically holds the circuitry required for interface to the heater circuits in the inkjet pens.

Full color printing and plotting requires that the colors from the individual pens be precisely applied to the media. This requires precise alignment of the carriage assembly. Unfortunately, mechanical misalignment of the pens in conventional inkjet printer/plotters results in offsets in the X direction (in the media or paper axis) and in the Y direction (in the scan or carriage axis). This misalignment of the carriage assembly manifests as a misregistration of the print images applied by the individual pens. In addition, other misalignments may arise due to the speed of the carriage, the curvature of the platen and/or spray from the nozzles.

However, the integration of the optical and electronic components in the optical sensor, as well as positioning the optical sensor on the carriage have been complicated, expensive and to some extent imprecise in prior printers/plotters. The need for reliability and precision is even greater in recent inkjet printers/plotters which print high resolution color graphics and images, often on very large poster-size printouts.

SUMMARY OF THE INVENTION

It is an object of the invention to solve the aforementioned deficiencies of the prior art, and provide a method and apparatus for assuring that a high degree of reliability is achieved for nonattended plotting.

A related object is to provide a pen verification system that provides predictable performance for different color pens.

A further object is to provide adequate optical sensing of pen lines under varying ambient light conditions.

In accordance with the foregoing objects, the invention provides a method of monitoring and controlling the quality of pen markings on a plotting medium by optically sensing across a sample line drawn on an actual medium.

In another separate and important aspect of the invention, a customized optical sensor is provided for monitoring plotter pen performance by sensing the quality of lines drawn on a medium. An LED emitting a green light beam is angularly directed toward an underlying line so as to reflect into an optical sensor which measures the print contrast ratio of a point on the line. Circuit means amplifies and filters the signal generated by the optical sensor.

Thus, by appropriate selection of the wavelength of the light used for sensing the markings on the medium, it is easily possible to check multi-color drawings for correct quality and colors.

In a presently preferred embodiment of the invention implemented in a color inkjet printer/plotter, a green LED is used for sensing sample patterns printed by each of the black (K), cyan (C) and magenta (M) printheads, while a blue LED is used for sensing sample patterns printed by the yellow (Y) printhead.

Moreover, a light tube on a carriage-mounted optical sensor has inner walls which help direct light from an LED toward an area surrounding a point under the sensor, and outer walls which help block out undesirable external light from being reflected from the area surrounding a point under the sensor into the photocell.

Thus, the invention contemplates optical sensing of different color markings on media using different color lights, whether those markings are vector lines drawn by a pen plotter or raster "lines" (i. e. bars) printed on a pixel grid by an inkjet printer/plotter.

BRIEF DESCRIPTION OF THE DRAWINGS

FIGS. 17A, 17B, 17C and 17D are a sequential representation showing a presently preferred set of modular assembly steps for the optical sensor unit;

FIG. 20 is an isometric view looking down from the right rear side of the carriage showing the optical sensor mounted on the carriage;

FIG. 26 is a table showing typical data obtained by using the optical sensor unit of the present invention;

DETAILED DESCRIPTION OF THE PREFERRED EMBODIMENTS

Generally speaking, as exemplified in a first embodiment shown in FIGS. 1–10, the invention is incorporated in a pen plotter comprising a pen for producing markings such as graphical representations on a medium, for example on a sheet of paper. The pen is held on a main carriage by a Z-axis carriage which can be lowered such that the tip of the pen contacts the medium in order to produce markings thereon. The pen comprises an ink reservoir containing ink of a certain color. The pen is held on the Z-axis carriage in a way so that it can easily be replaced by another pen, for example if a different color for the graphical representation is desired or if the ink reservoir in the pen is empty. The replacement of the pen can be done manually by a user, but it is preferred to perform the replacement automatically under-computer control. Several replacement pens and additional pens of different colors can be arranged in a pen carousel (not shown) from which they can be transported to the Z-axis carriage and inserted there. For producing two-dimensional plots on a sheet of paper, the paper is moved in a first direction (X-direction) and the main carriage is moved in a second direction (Y-direction) orthogonal thereto. The driving of the paper can be accomplished by means of a grit wheel and pinch wheel assembly between which the paper is moved. By appropriate movement of the paper (either in the positive or negative X-direction) and coordinated related movement of the main carriage (either in the positive or negative Y-direction), any desired graphical representation can be made on the paper sheet. Of course, the invention is not limited to any particular type of plotter, but can be utilized in any plotter configuration where line vectors are drawn on media by pens. For example, another type of plotter which may utilized the invention holds the paper stationary while the main carriage is moveable in the X- and Y-directions so that the pen can be placed on any desired point of a media sheet.

A sensing system intermittently monitors the quality of the pen on the media by scanning across a point on a line, with the point illuminated by light emitted from a light source as an LED emitting a beam of green light.

The output signals of the sensing system are amplified filtered and converted into digital data. This digital data is then supplied to a microprocessor 79 for comparison with benchmark data.

Optical sensor circuits 78 provide input signals to a light source on the pen carriage 20 and then process output signals from the optical sensor on the pen carriage 20 back to the microprocessor 79.

Figure 1:
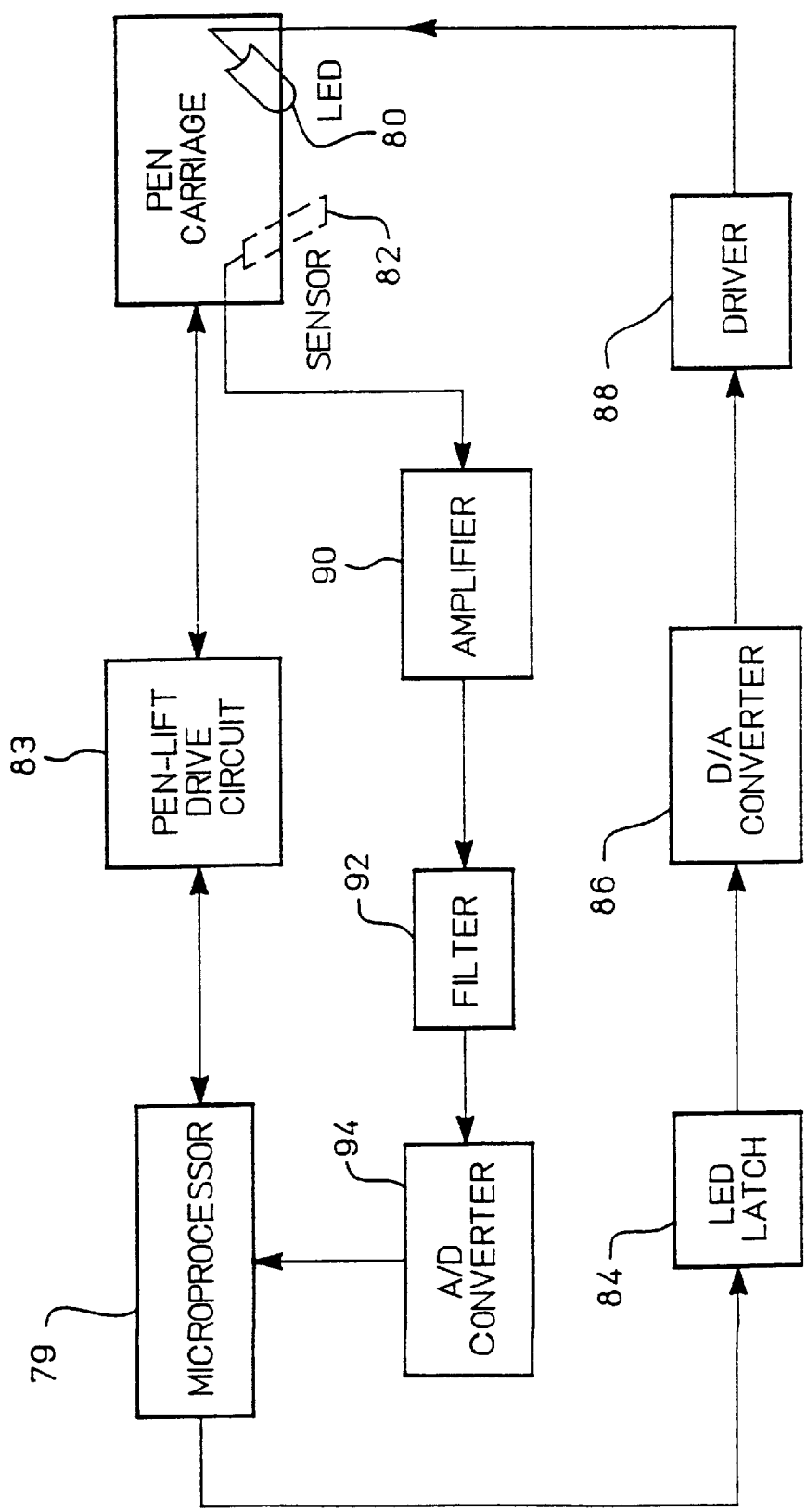
FIG. 1 is a block diagram of a first embodiment showing various circuit interconnections between a pen carriage and a microprocessor.
Figure 8:
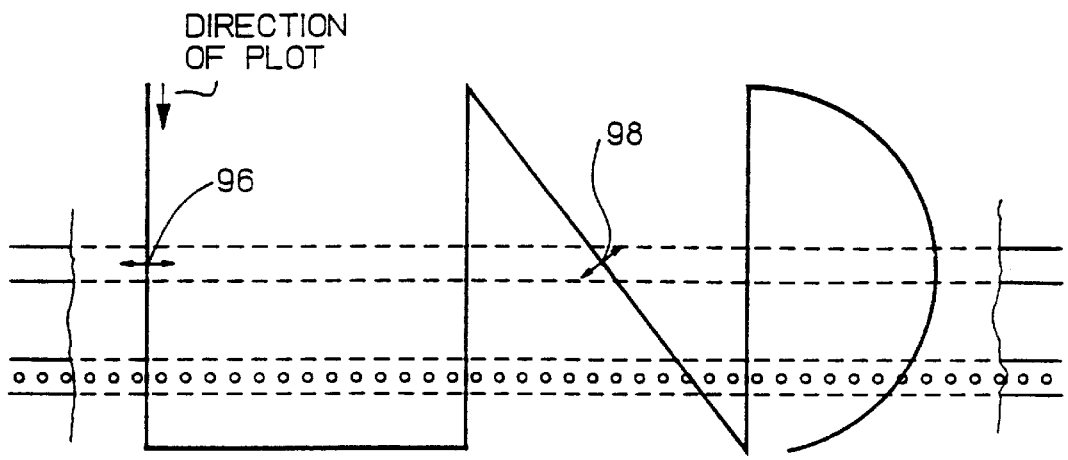
FIGS. 8 and 9 are schematic diagrams showing exemplary locations for optically sensing the quality of a line by scanning across a point on the line.
Figure 9:
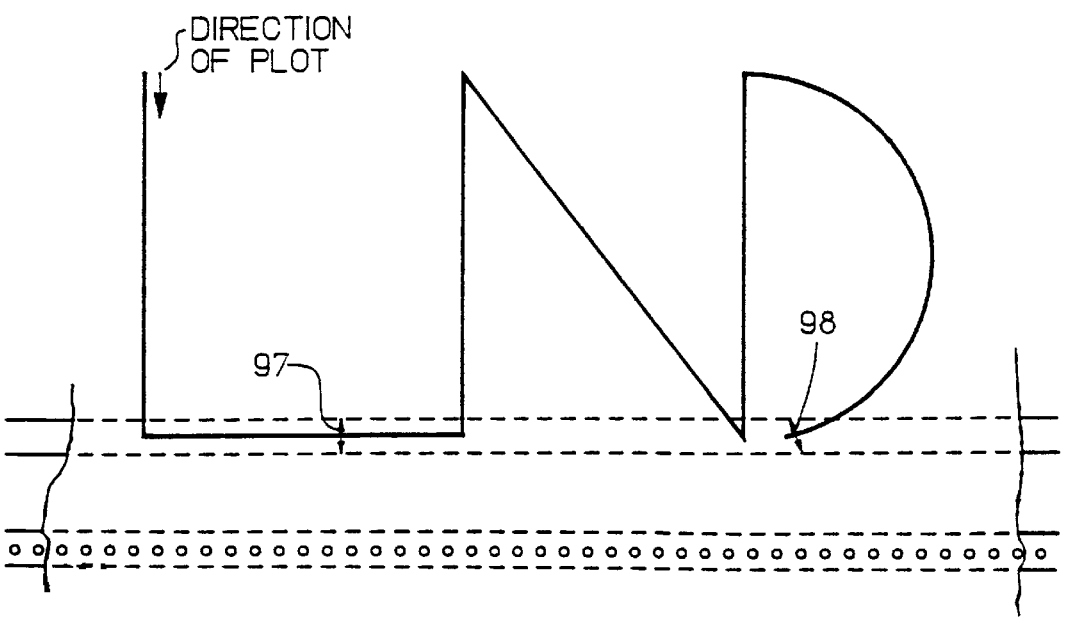

Referring now to FIG. 1, the various interconnecting circuits for actuating the pen verification procedures are shown in a block diagram. Since a light source in the form of an LED 80 and a optical source sensor 82 are directly mounted on the pen carriage 20, a pen-lift drive circuit 83 is interconnected between the microprocessor 79 and the pen carriage 20 to move the carriage into the optimum focal distance above the media. Signals from the microprocessor 79 are passed through latch 84 to a digital/analog converter 86 which produces an output signal which passes through driver 88 to the LED 80. The LED transmits a wide beam of light (see outwardly flared arrows schematically extending below LED 80 in FIG. 4) having a color centered in the visual spectrum to a predetermined locale around a line vector on the medium, and the sensor 82 measures the intensity of the reflected light as the sensor scans across the line (i.e., from one side of the line through a point on the line to the other side of the line). Typical scans of actual plots are shown in FIGS. 8–9 at 96, 97, and 98, and a typical curve of the intensity for a satisfactory pen marking a shown in graph 100 of FIG. 10.

Figure 2:
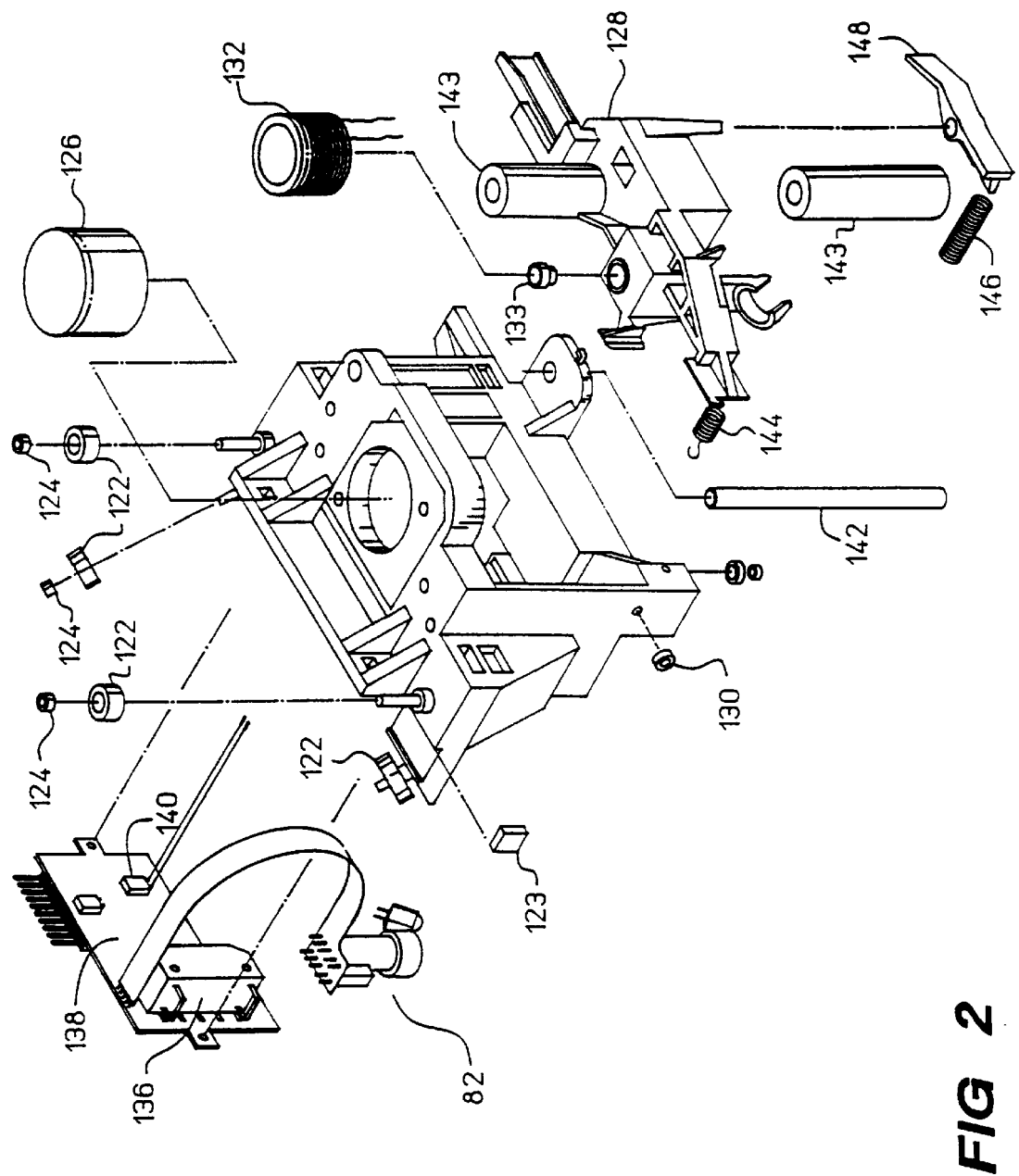
FIG. 2 is an exploded view of the main carriage of a first embodiment of the invention.
Figure 4:
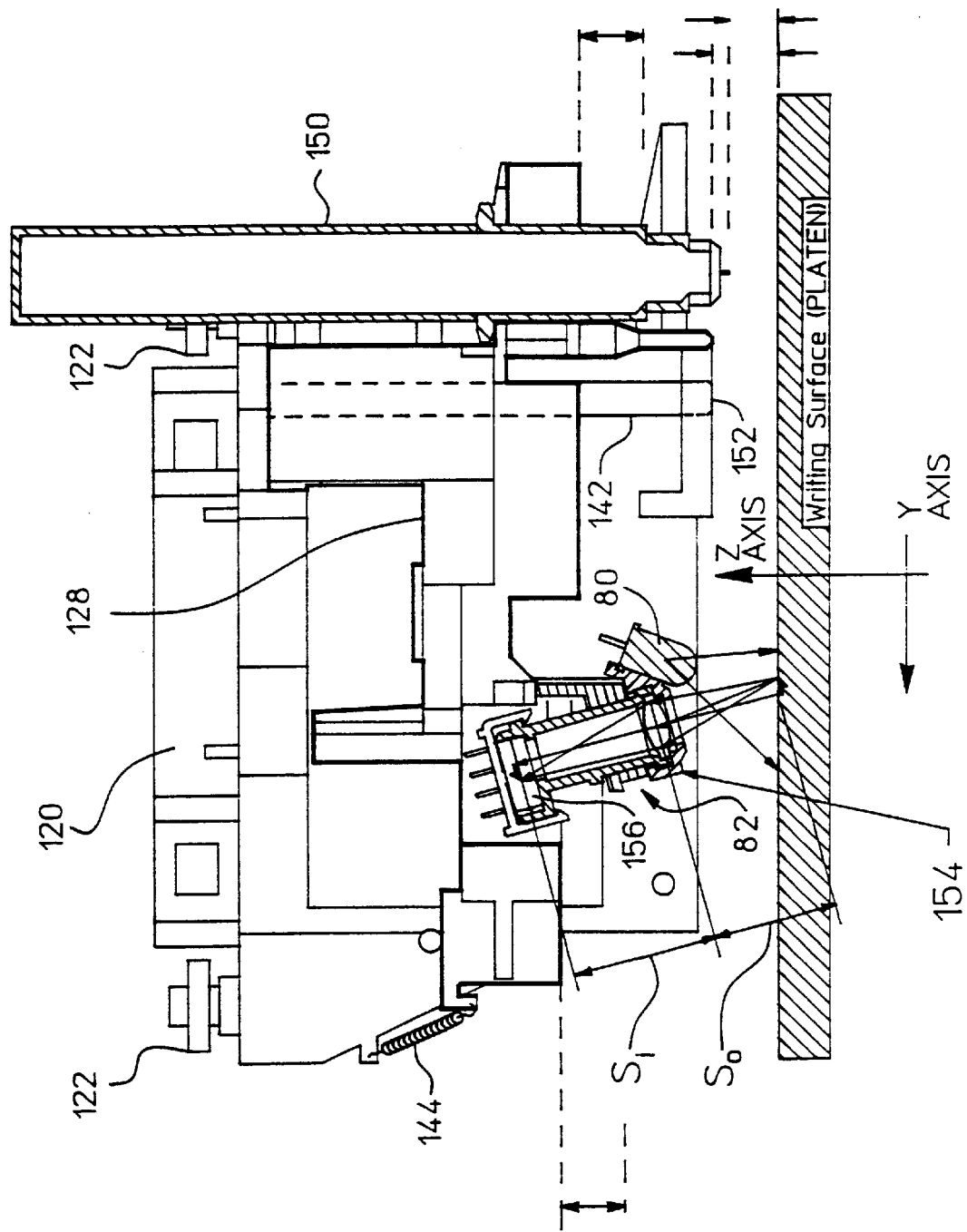
FIG. 4 is a side view of the main carriage of FIG. 2 showing the Z-axis (darkly outlined) holding a pen in raised position.

The structural details of the pen carriage 20 are shown in the exploded view of FIG. 2, and the front view of FIG. 4. A main carriage 120 carries variously positioned Y-direction tires 122 mounted on bearings 124, and a bumper 123, to facilitate the movement along the Y-axis. In order to provide movement of the Z-carriage and the pen between a raised position to a lowered position (see the double pointed arrows in FIG. 8), the main carriage also carries a magnetic cup 126 and a Z-direction tire 130 for engagement with a Z-axis carriage 128. An energized coil 132 mounted on an insert 133 in the Z-axis carriage is magnetically pushed away from its matching magnetic cup 126 to move the pen into the down position. The actual location of the pen (and sensor/LED assembly described in more detail below) relative to the underlying media is monitored by an encoder scale 134 which moves up and down adjacent to an optical encoder 136. A carriage PCB 138 carries the encoder 136 and also provides the circuit interconnections through wires 140 to the coil as well as the circuit interconnections to the LED 80 and the sensor 82. A stationary inner linear bearing 142 engages a matching moving outer bearing sleeve 143, and an expansion spring 144 holds the Z-carriage in a normally raised position.

Figure 3:
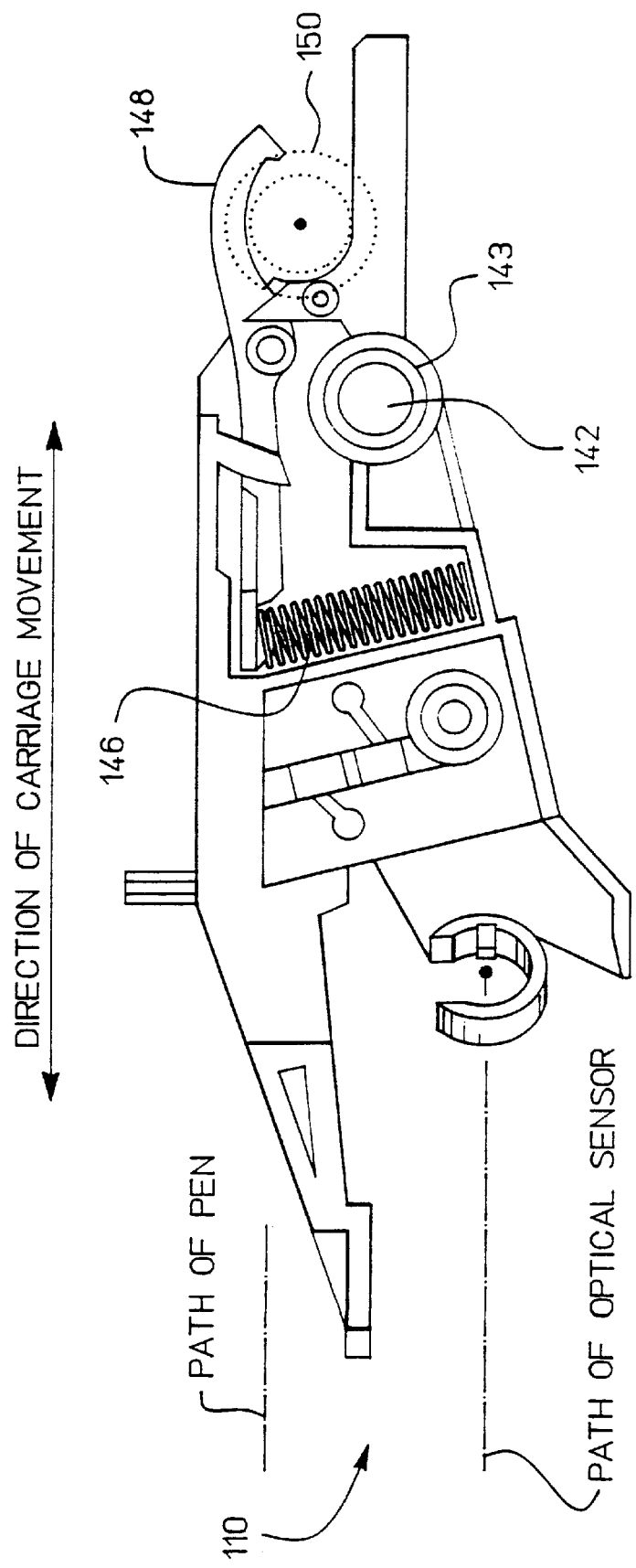
FIG. 3 is a bottom view of the Z-axis carriage showing a pen path which is offset from an optical sensor path.

When a pen is mounted on the carriage 20, a compression spring 146 forces a pawl 148 into locking engagement against the outer pen casing 150 (see FIG. 3).

It is preferable to calibrate each plotter before it is used in order to optimize the ability of the sensor to measure the light intensity of a plotted line. Accordingly, as best shown in FIG. 4, the pen is removed and a paper feeler 152 can then be used to determine the actual distance to a sheet of underlying media for this particular plotter. In addition, the paper feeler can scan the platen along the entire length of the Y-axis to determine variations in this actual distance measurement. Such actual distances measured during calibration are recorded in memory so that during normal operation the Z-axis carriage can be moved to achieve the optimum focal distances as shown in mm in the drawing of FIG. 4. It has been determined that the present invention nevertheless operates satisfactorily for a photodiode 156 spaced a distance "Si" of 17.2 mm from a lens 154 even though the distance "So" of 15.1 mm between the lens and the medium may vary plus or minus 1.5 mm.

Figure 5:
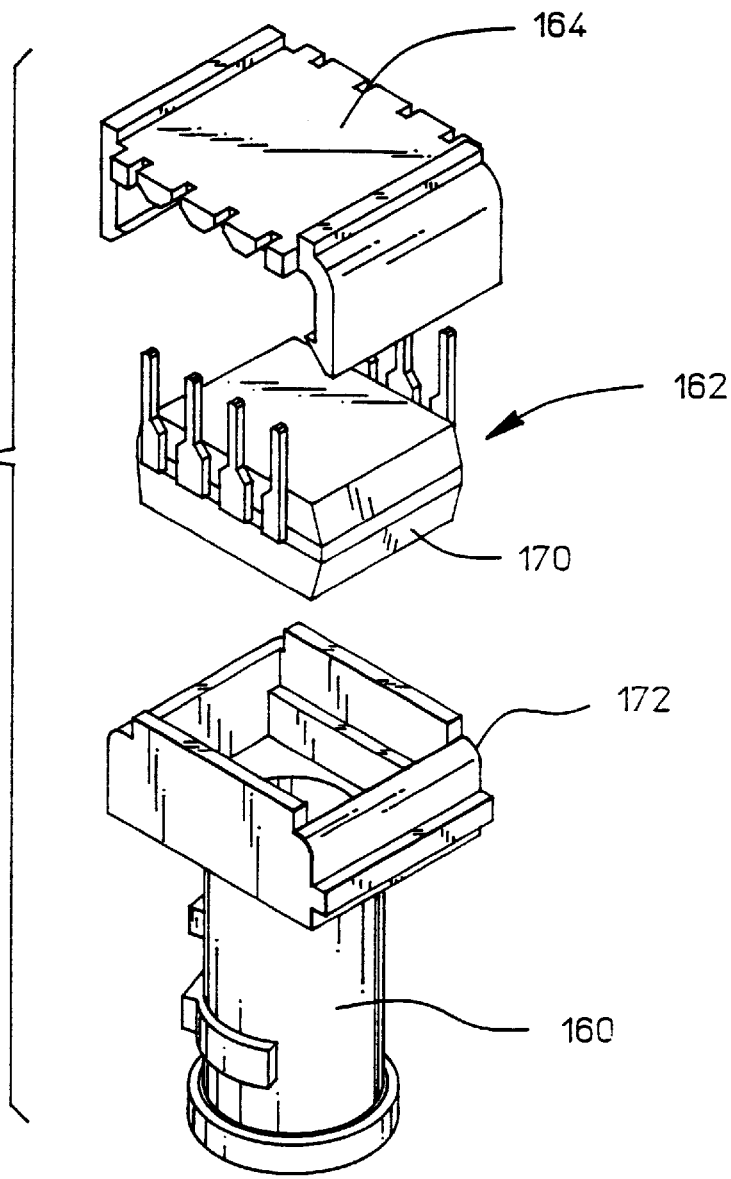
FIG. 5 is a perspective view showing an optical sensor holder which is mountable on the Z-axis carriage.
Figure 6:
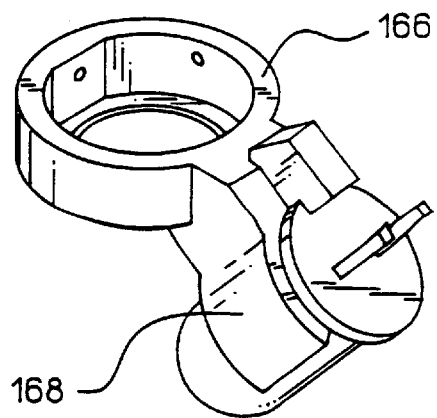
FIG. 6 is a perspective view showing an LED holder which is attachable to the optical sensor holder.

The sensor 82 is shown in detail in FIGS. 5–6 and includes a casing 160, a chip assembly 162, a cap 164, and a sleeve 166 having a bracket 168 for holding the LED 80. The sleeve snaps into position at the bottom of the casing 160 and holds the lens in fixed position inside the sleeve at the lower end of the casing. The chip assembly includes a photodiode as well as a two-stage amplifier, and the lower portion 179 of the chip assembly is transparent (such as clear plastic) to allow reflected light to pass unimpeded to the photodiode. The cap 164 must fit snugly over the top of the chip assembly to nest into a casing receptacle to prevent any extraneous light: from passing through to the photodiode. Although both the sensor and the LED are shown at an angle with respect to the Z-direction, it is possible to have other angular positioning of the sensor, so long as the LED preferably emits light at an angle to avoid undue specular glare from the media.

Thus, the invention provides a method and apparatus for using a uniquely designed optical sensor that periodically senses the quality of plotted lines by scanning across selected points on the lines, and measuring the difference in contrast between the actual plotted line and a benchmark such as a default value or an actual value obtained when that particular pen was qualified. When the optical line sensor detects a pen failure or pen deficiency, the plotter corrects the problem.

Figure 7:
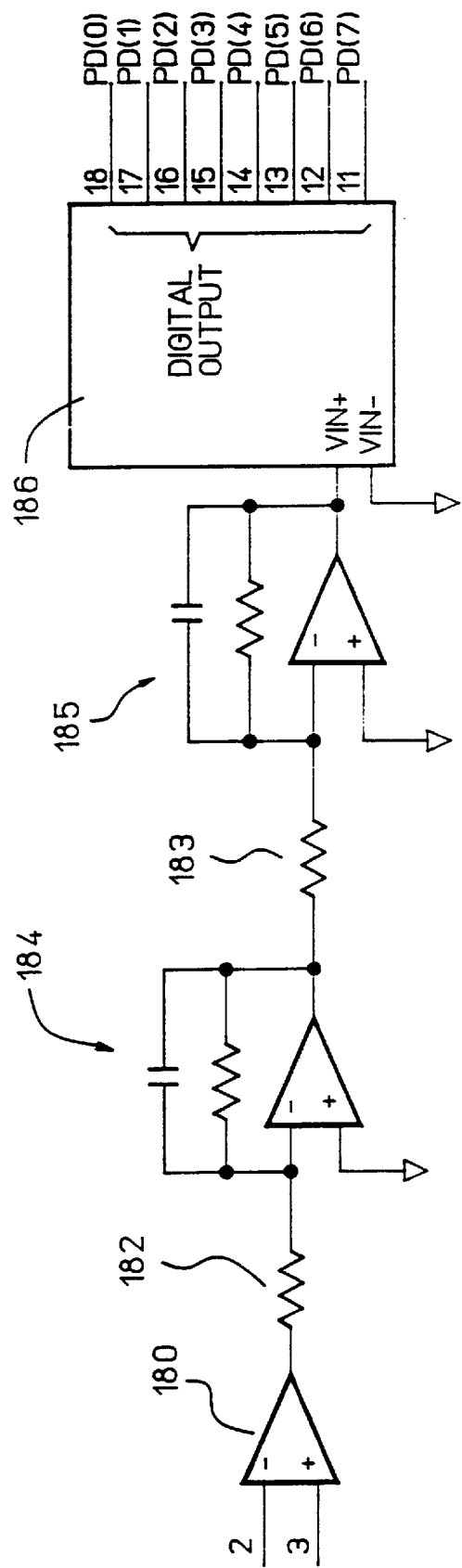
FIG. 7 is a schematic circuit diagram showing an amplifier and filter circuit for processing a signal from the sensor.

FIG. 7 shows in more detail the processing of the output signal from the sensor through op-amp 180, resistors 182, 183, filter circuits 184, 185 and A/D converter 186.

Figure 10:
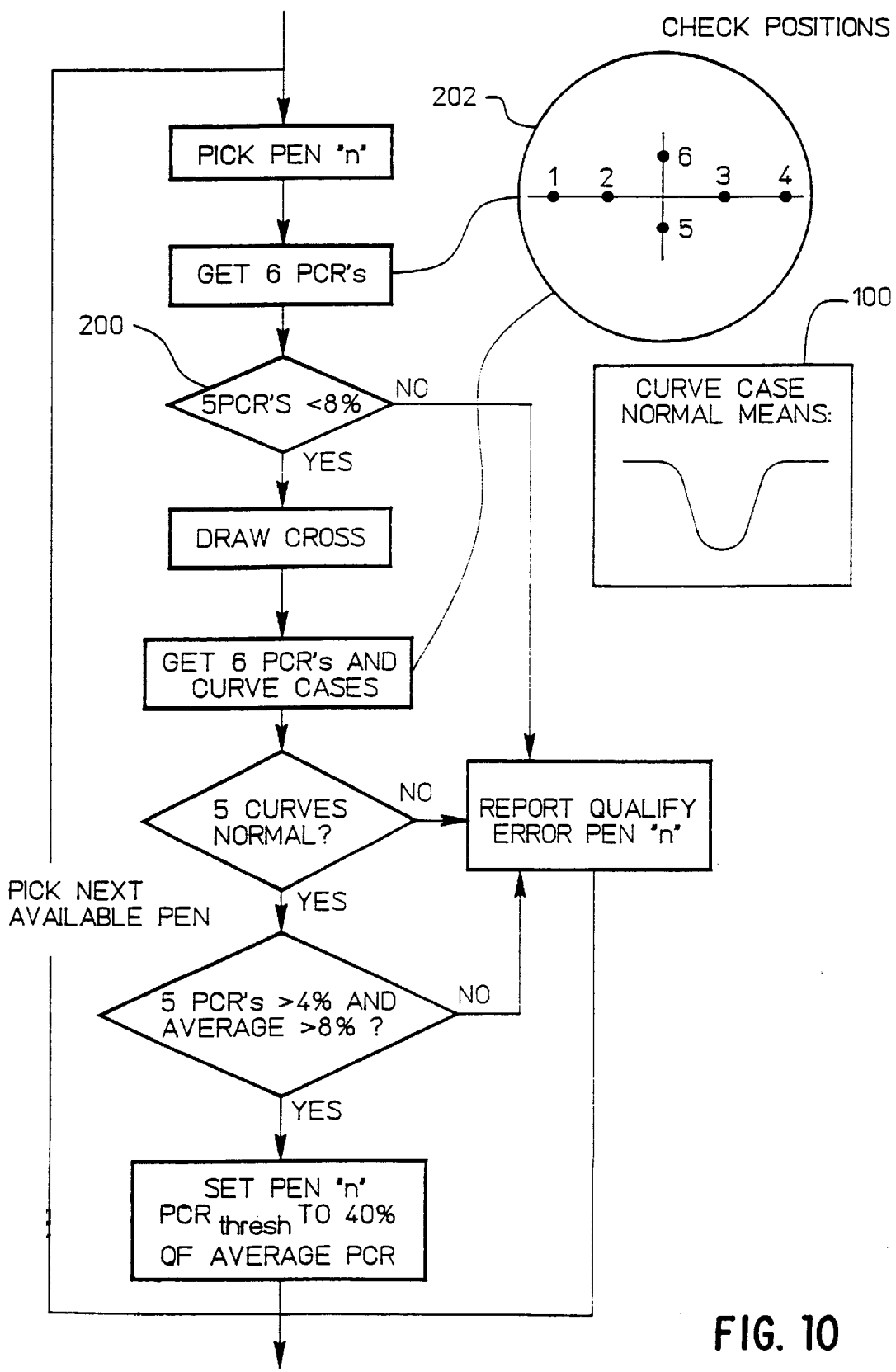
FIG. 10 is a flow chart for qualifying pens and thereafter setting the print contrast ratio (PCR) threshold for that particular pen.

In the flow chart of FIG. 10, it is important to first check the media such as paper at the actual spot where the sample vectors are to be drawn to be sure there are not a ready previous plots or other non-white interference. The first percentage measurement at 200 is based on the percentage drop in reflected signal intensity from total white to absolute dark (total light absorbance). Thus, if five of the proposed six points each show a print contrast ratio of less that 8%, the it is ok to proceed to the next stage of actually drawing the sample plot as shown at 202.

In order to establish the PCR threshold, various procedures can be used. In the preferred form of the invention, the average intensity of the PCRs for five points is computed, and then so long as the pen plots checked during the pen verification procedure have PCRs of not less than 40% of such average, then the plots actually tested are deemed satisfactory. If a user is using only black pens and does not need high quality plotting, it is possible to forego the actual pen qualification procedure and just accept that any pen having a print contrast ratio of more than the default of 8% on the scale of percentage signal drop form all white to total darkness will be deemed a "good" pen.

Figure 11:
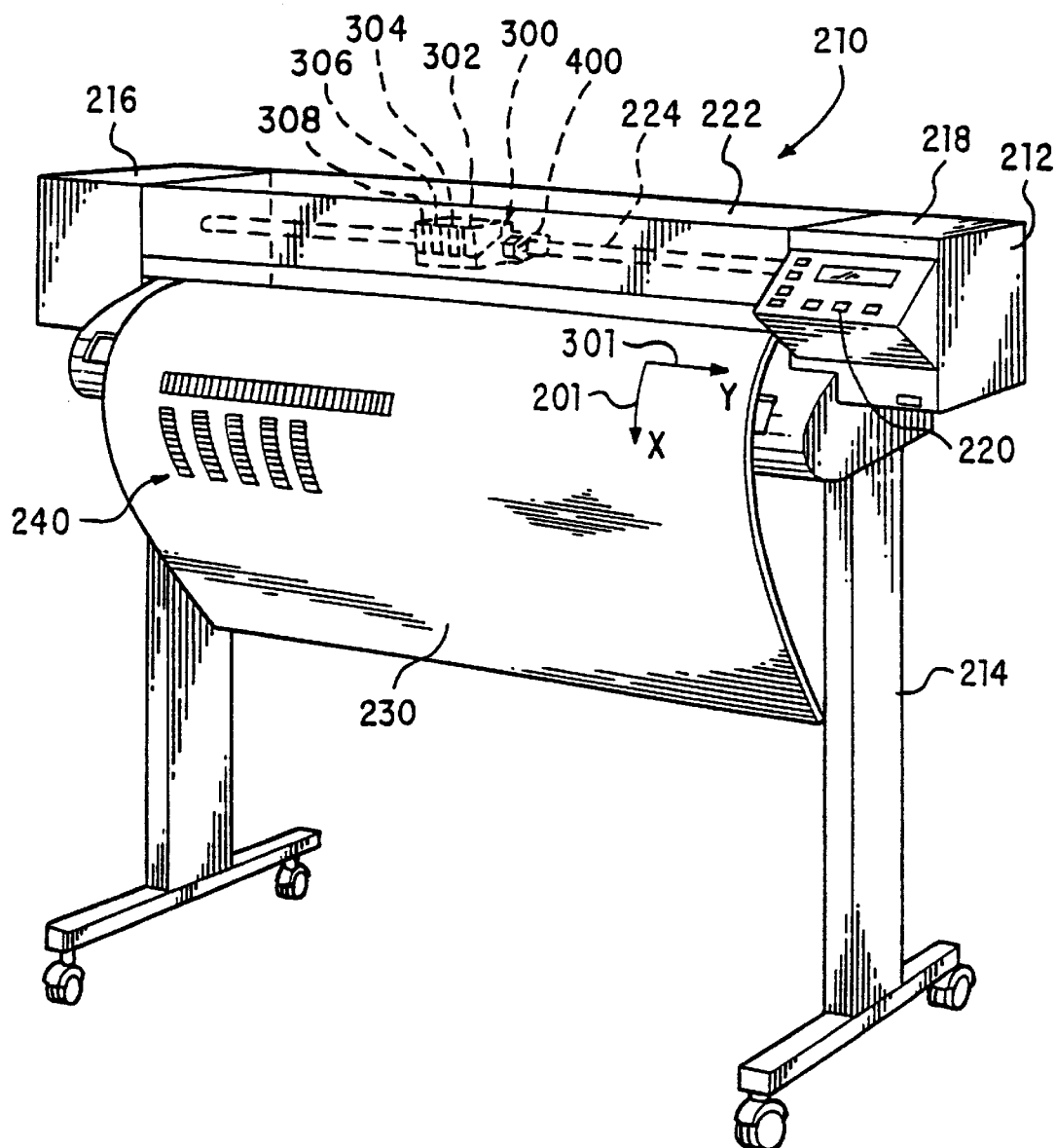
FIG. 11 is a perspective view of a second embodiment of a large format inkjet printer/plotter incorporating the features of the present invention.

A second embodiment of the invention is exemplified in a large format color inkjet printer/plotter as shown in FIGS. 11–29. More specifically, FIG. 11 is a perspective view of an inkjet printer/plotter 210 having a housing 212 mounted on a stand 214. The housing has left and right drive mechanism enclosures 216 and 218. A control panel 220 is mounted on the right enclosure 218. A carriage assembly 300, illustrated in phantom under a cover 222, is adapted for reciprocal motion along a carriage bar 224, also shown in phantom. The position of the carriage assembly 300 in a horizontal or carriage scan axis is determined by a carriage positioning mechanism 310 with respect to an encoder strip 320 (see FIG. 12). A print medium 330 such as paper is positioned along a vertical or media axis by a media axis drive mechanism (not shown). As used herein, the media axis is called the X axis denoted as 201, and the scan axis is called the Y axis denoted as 301.

Figure 12:
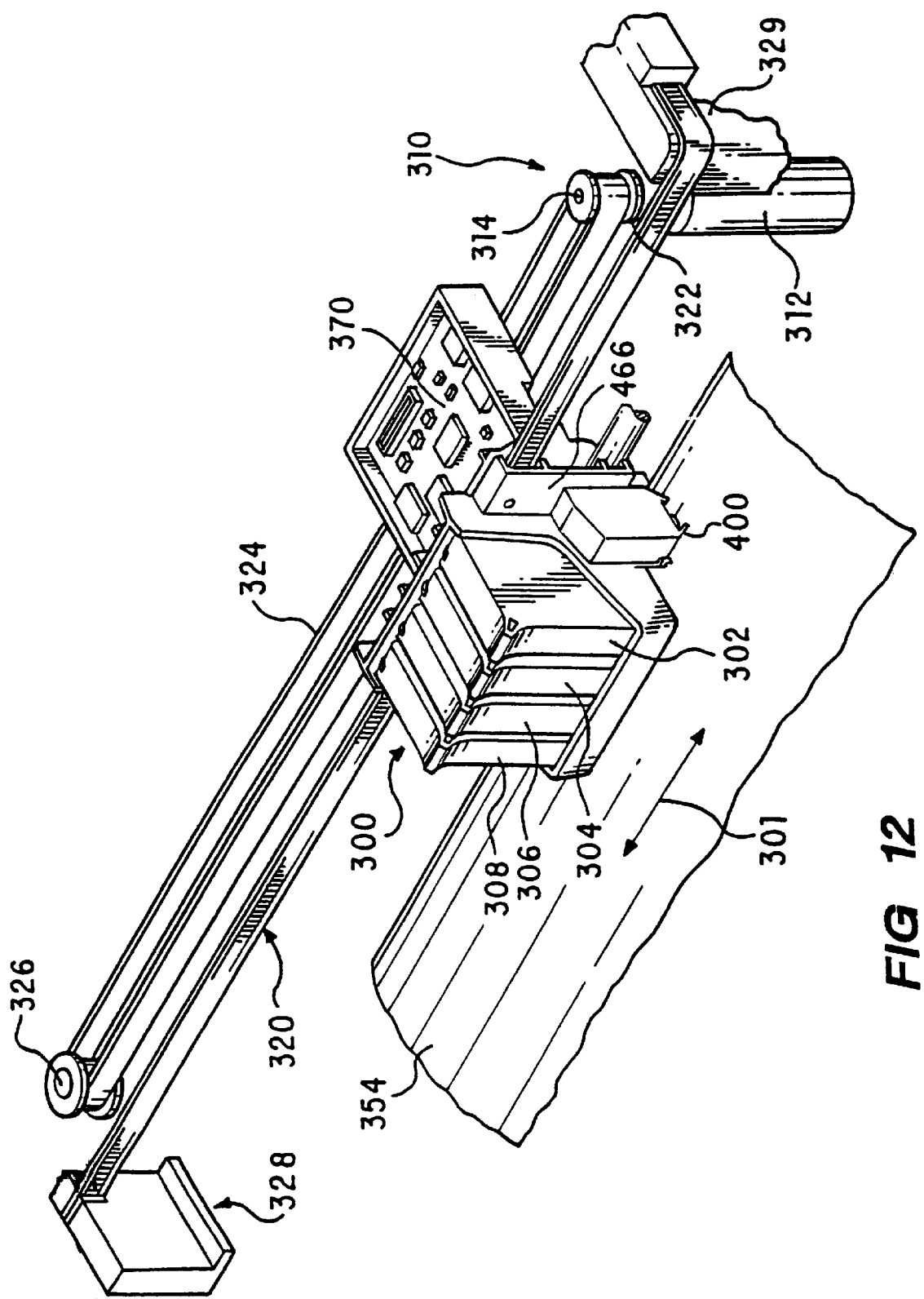
FIG. 12 is close-up view of the carriage portion of the printer/plotter of FIG. 11 showing a carriage-mounted optical sensor of the present invention.

FIG. 12 is a perspective view of the carriage assembly 300, the carriage positioning mechanism 310 and the encoder strip 320. The carriage positioning mechanism 310 includes a carriage position motor 312 which has a shaft 314 which drives a belt 324 which is secured by idler 326 and which is attached to the carriage 300.

The position of the carriage assembly in the scan axis is determined precisely by the encoder strip 320. The encoder strip 320 is secured by a first stanchion 328 on one end and a second stanchion 329 on the other end. An optical reader (not shown) is disposed on the carriage assembly and provides carriage position signals which are utilized-by the invention to achieve optimal image registration in the manner described below.

Figure 13:
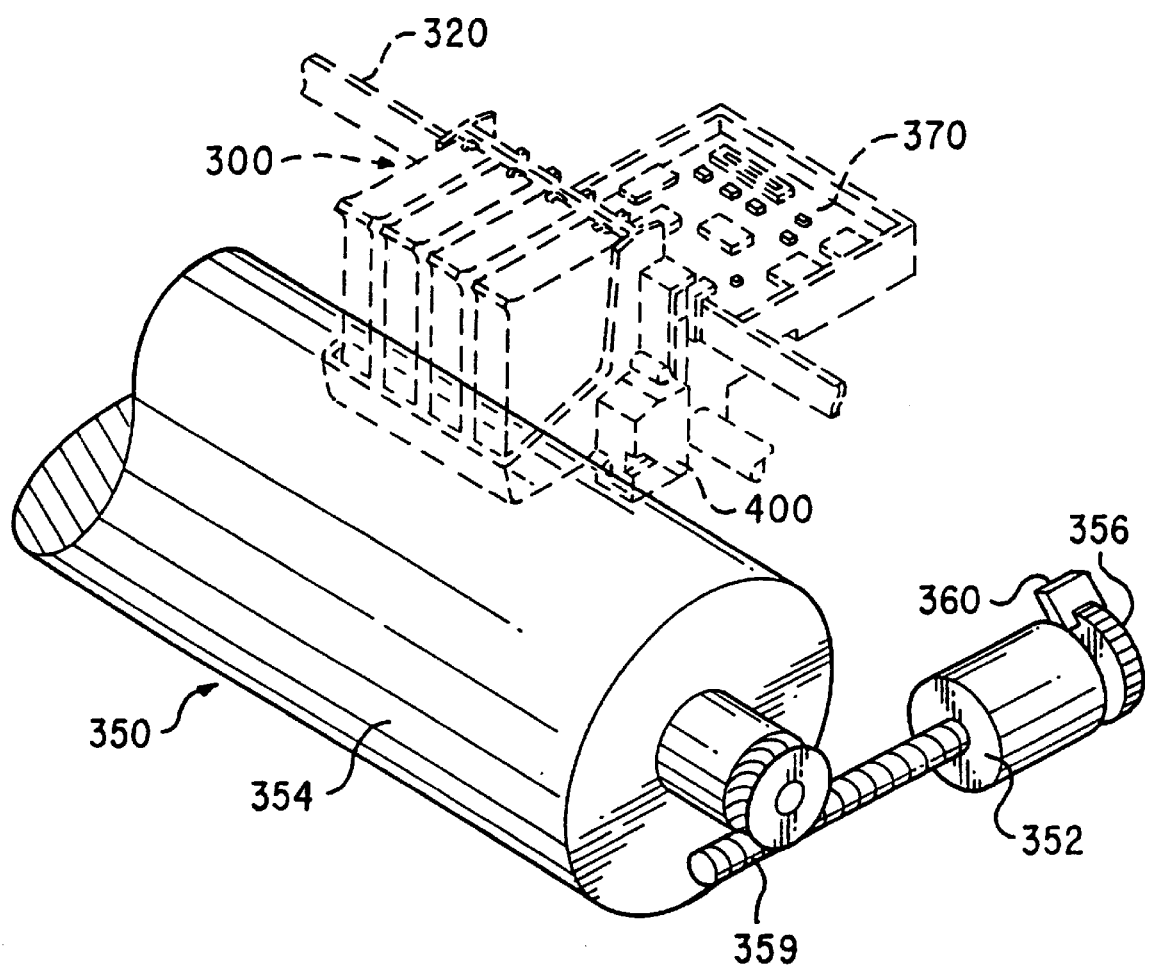
FIG. 13 is a close-up view of the platen portion of the printer/plotter of FIG. 11 showing the carriage portion in phantom lines.

FIG. 13 is perspective view of a simplified representation of a media positioning system 350 which can be utilized in the inventive printer. The media positioning system 350 includes a motor 352 which is normal to and drives a media roller 354. The position of the media roller 354 is determined by a media position encoder 356 on the motor. An optical reader 360 senses the position of the encoder 356 and provides a plurality of output pulses which indirectly determines the position of the roller 354 and, therefore, the position of the media 230 in the X axis.

The media and carriage position information is provided to a processor on a circuit board 370 disposed on the carriage assembly 100 for use in connection with printhead alignment techniques of the present invention.

The printer 210 has four inkjet print cartridges 302, 304, 306, and 308 that store ink of different colors, e.g., black, magenta, cyan and yellow ink, respectively. As the carriage assembly 300 translates relative to the medium 230 along the X and Y axes, selected nozzles in the inkjet print cartridges 302, 304, 306, and 308 are activated and ink is applies to the medium 230. The colors from the three color cartridges are mixed to obtain any other particular color. Sample lines 240 are typically printed on the media 230 prior to doing an actual printout in order to allow the optical sensor 400 to pass over and scan across the lines as part of the initial calibration.

The carriage assembly 300 positions the inkjet print cartridges and holds the circuitry required for interface to the ink firing circuits in the print cartridges. The carriage assembly 300 includes a carriage 301 adapted for reciprocal motion on front and rear slider rods 303, 305.

As mentioned above, full color printing and plotting requires that the colors from the individual print cartridges precisely applied to the media. This requires precise alignment of the carriage assembly as well as precise alignment of the print cartridges in the carriage. Unfortunately, paper slippage, paper skew, and mechanical misalignment of the print cartridges results in offsets in the X direction (in the media advance axis) and in the Y direction (in the carriage or axis) as well as angular theta offsets. This misalignment causes misregistration of the print images/graphics formed by the individual ink drops on the media. This is generally unacceptable as multi-color printing requires image registration accuracy from each of the printheads to within $1/1000$ inch (1 mil).

Figure 14:
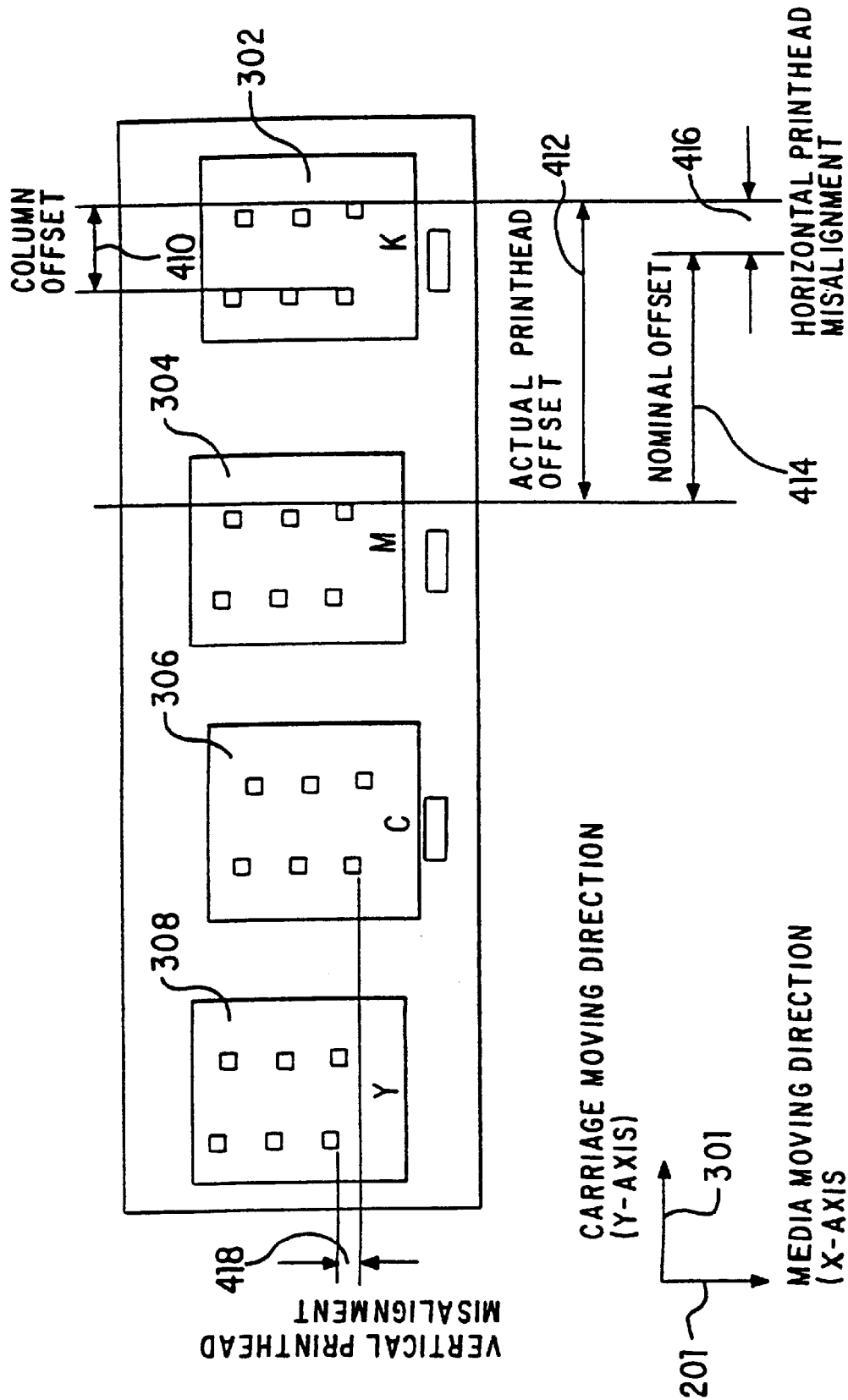
FIG. 14 is a schematic representation of a top view of the carriage showing offsets between individual print-heads in the media advance axis and in the carriage scan axis.

FIG. 14 shows a presently preferred embodiment of printheads each having two groups of nozzles with a column offset 410. By comparing the relative positions of corresponding nozzles in different printheads along the Y axis, it is possible to determinine an actual horizontal offset 412 between two printheads, and by comparison with a nominal default offset 414 determine an actual offset 416 in the carriage scan axis. This is repeated for all of the different printheads while they remain on the carriage.

Similarly, by comparing the relative positions of corresponding nozzles in different printheads along the X axis, it is possible to determine an actual vertical offset 418 in the media advance axis. This is also repeated for all of the different printheads while they remain on the carriage.

Figure 15A:
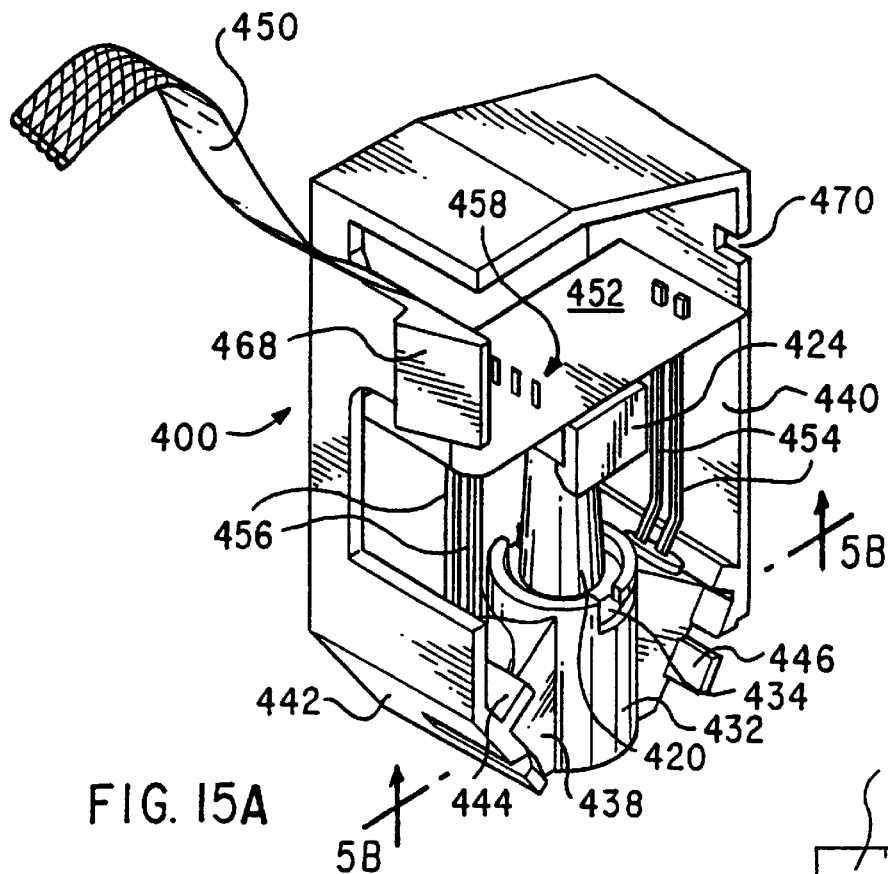
FIG. 15A is an isometric view showing a fully assembled optical sensor unit incorporating a presently preferred embodiment of the invention.
Figure 15B:
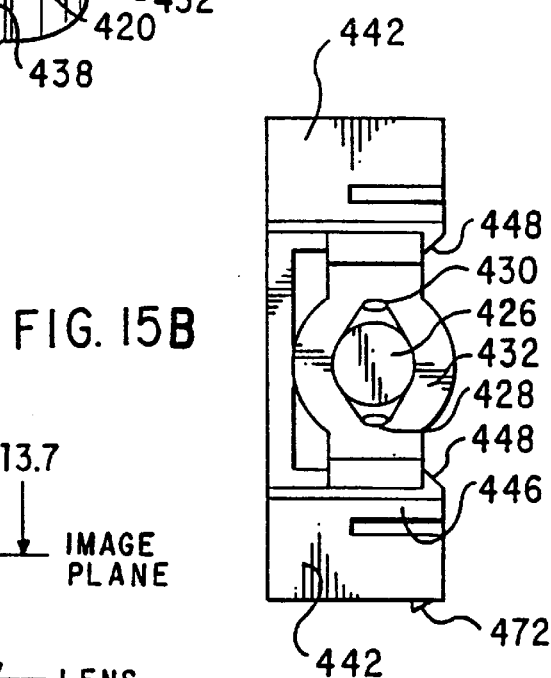
FIG. 15B is a bottom view of the optical sensor unit taken along the line 15B—15B in FIG. 15A.
Figure 16:
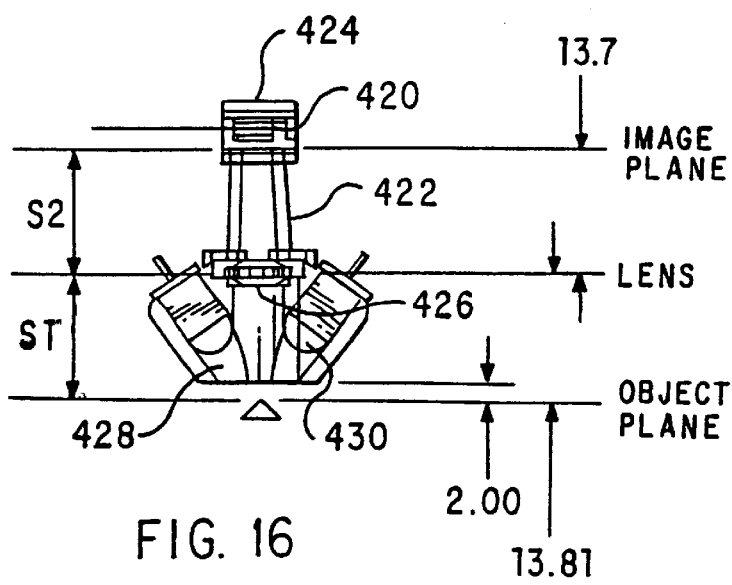
FIG. 16 is a front view of the optical components of the sensor unit of FIG. 15A.

In order to accurately scan across a test pattern line, the optical sensor 400 is designed for precise positioning of all of its optical components. Referring to FIGS. 15A, 15B and 16, the sensor unit includes a photocell 420, holder 422, cover 424, lens 426, and light source such as two LEDs 428, 430. A unitary light tube or cap 432 has a pair of notched slots 434 which engage matching tabs 436 on a lower end of the holder 422 upon insertion and relative rotation between the cap and the holder. The two LEDs are held in opposite apertures of two shoulders 438 which have a size slightly less than the outside diameter of the LEDs, to prevent the LEDs from protruding into a central passageway which passes through the holder to the photocell A protective casing 440 which also acts as an ESD shield for the sensor components is provided for attachment to the carriage as well as for direct engagement with the shoulders of the light tube. In that regard, the top of the shoulders are sized and shaped to snugly fit inside downwardly tapered side walls 442 of the casing, with the top of the LEDs abutting against an upstanding flange 444 and with a lower portion of the shoulders held tightly by arms 446 which flex outwardly to an open position while the light tube is being pushed into a position of engagement with the casing. Upon completion of the engagement, the arms return to a closed latched position with a lip 448 on the end of each arm 446 preventing disengagement of the light tube (and its LEDs) during normal use.

FIGS. 17A–17E show a preferred sequence of steps for assembling the optical sensor. Firstly, a modular flex-circuit assembly is created with an elongated TAB circuit 450 having a junction portion 452 with soldered through-holes which (a) connect and support a first pair of wire leads 454 to one LED, (b) connect and support a second pair of wire leads 456 to another LED, and (c) connect and support a set of three wire leads 458 coming from the photocell (FIG. 17A). Secondly a U-shaped cover 424 holds the photocell in nested position at the upper end of the holder, while the LEDs and holder are positioned by the light tube (FIG. 17B–17C). Finally, the subassembly is inserted into the casing, with a free end 462 of the TAB circuit extending out through an access slot in the casing (FIGS. 17D and 17E).

It will be appreciated by those skilled in the art from the foregoing description that the invention provides a self-fixturing modular assembly whereby the light tube acts as a cap for holding both the two LEDs as well as the lens/holder/photocell/cover composite in fixed relative positions. Accordingly, if desirable the soldering of the interconnections at the co-planar junction portion of the flex-circuit can be done after assembly of the various component parts held by the cap.

Figure 19:
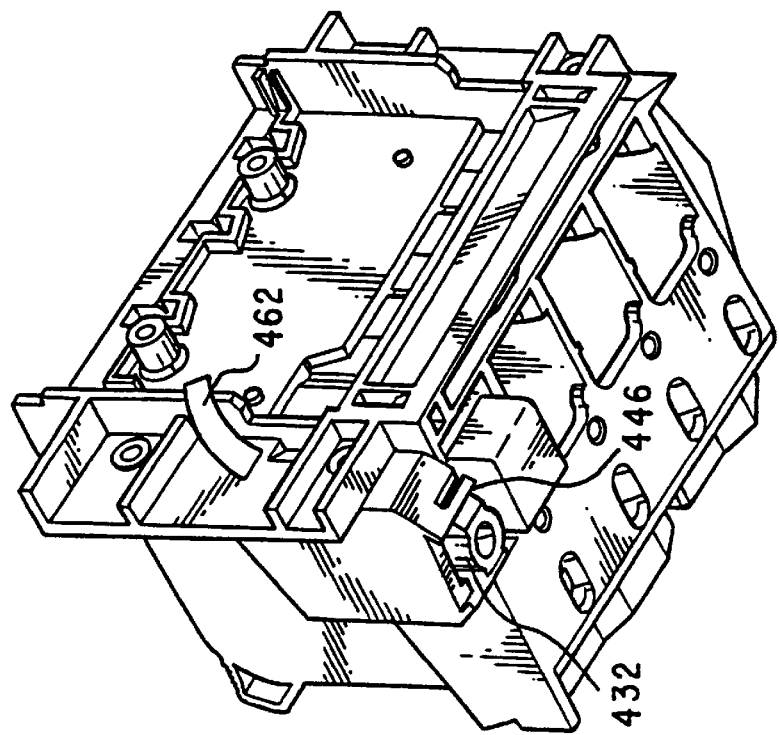
FIG. 19 is an isometric view looking up from the right rear side of the carriage showing the optical sensor and one print cartridge mounted on the carriage.
Figure 18:
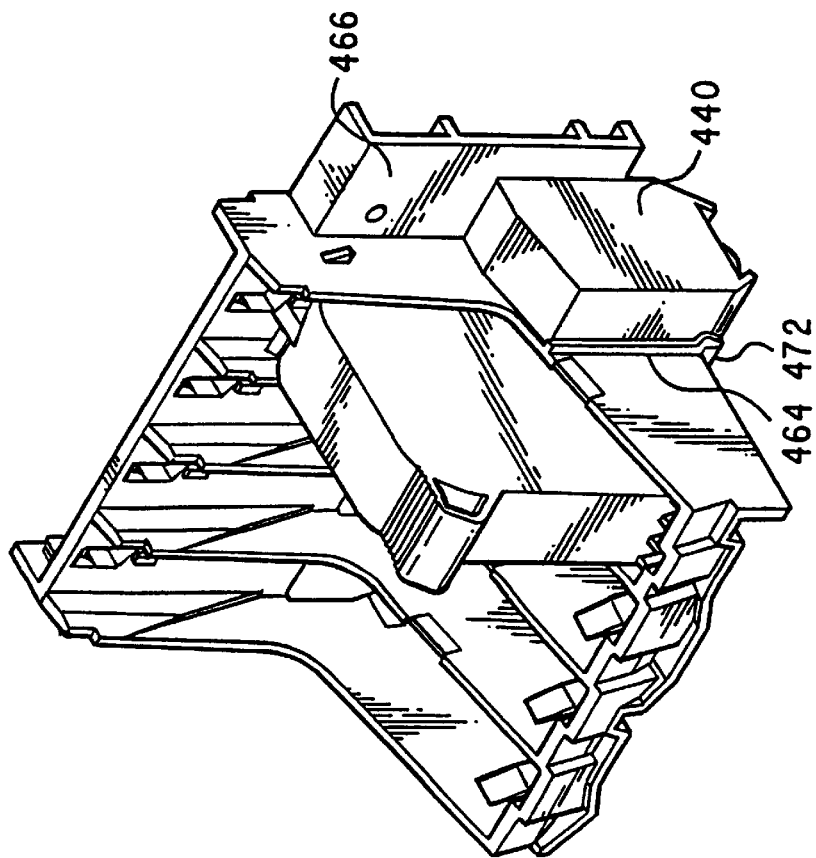
FIG. 18 is an isometric view looking down from the right front side of the carriage showing the optical sensor and one print cartridge mounted on the carriage.

The fully assembled optical sensor unit can then be placed inside of vertical rib 464 and against back plate 466 for self-attachment by rear tab 468, front notch 470, and lower front hook 472 to matching X/Y/Z datum-like surfaces on the carriage (see FIGS. 18–20).

It will be understood by those skilled in the art that by having the electronic components of the optical sensor all connected through a common co-planar junction portion of a flex-circuit allows the flex-circuit to be small and less costly. Also, it allows for the substitution of an even less expensive printed circuit board at the common junction if that is deemed necessary.

Figure 22:
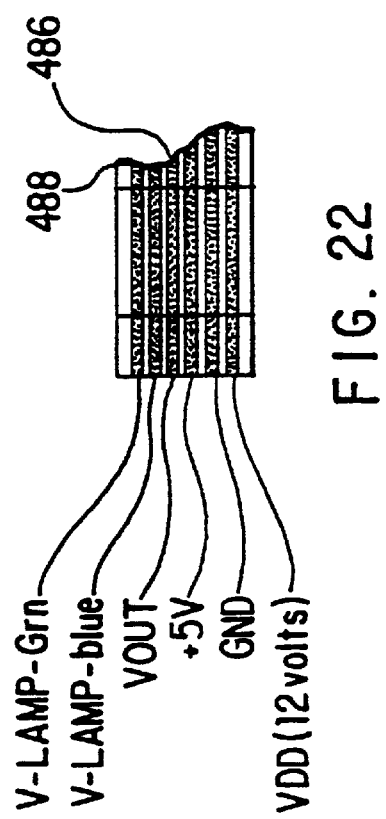
FIG. 22 is a top view identifying an exemplary circuit arrangement at a second end of the flex circuit.
Figure 21:
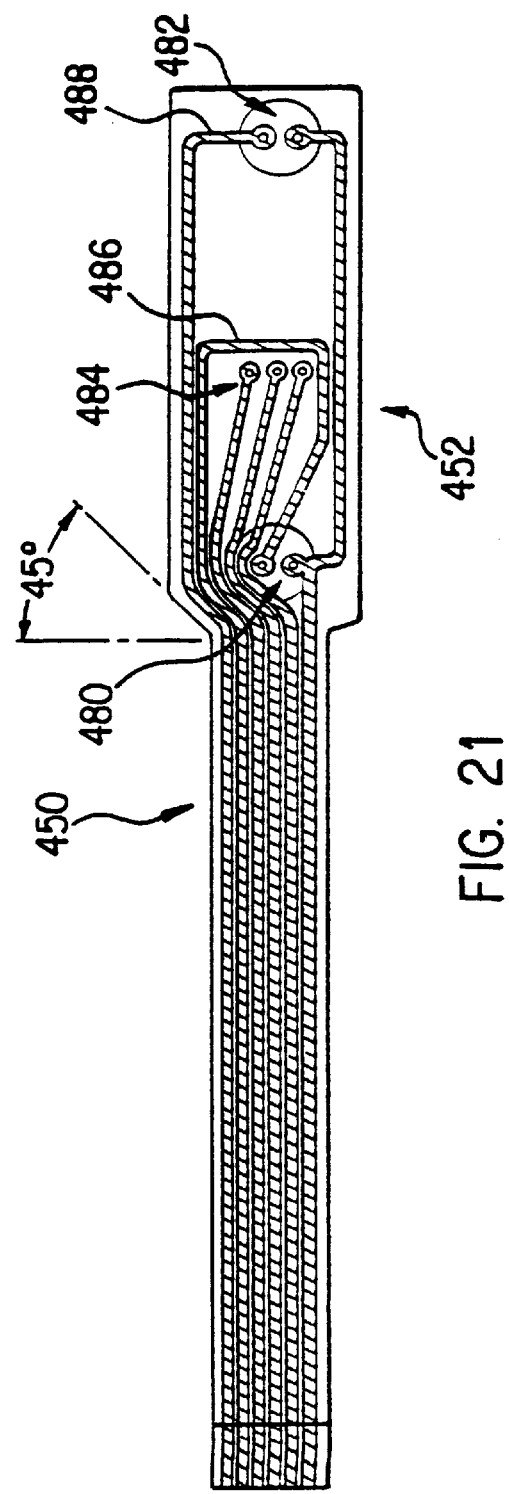
FIG. 21 is a top view of the entire flex-circuit showing the details of the co-planar junction portion at a first end of the flex-circuit.
Figure 23:
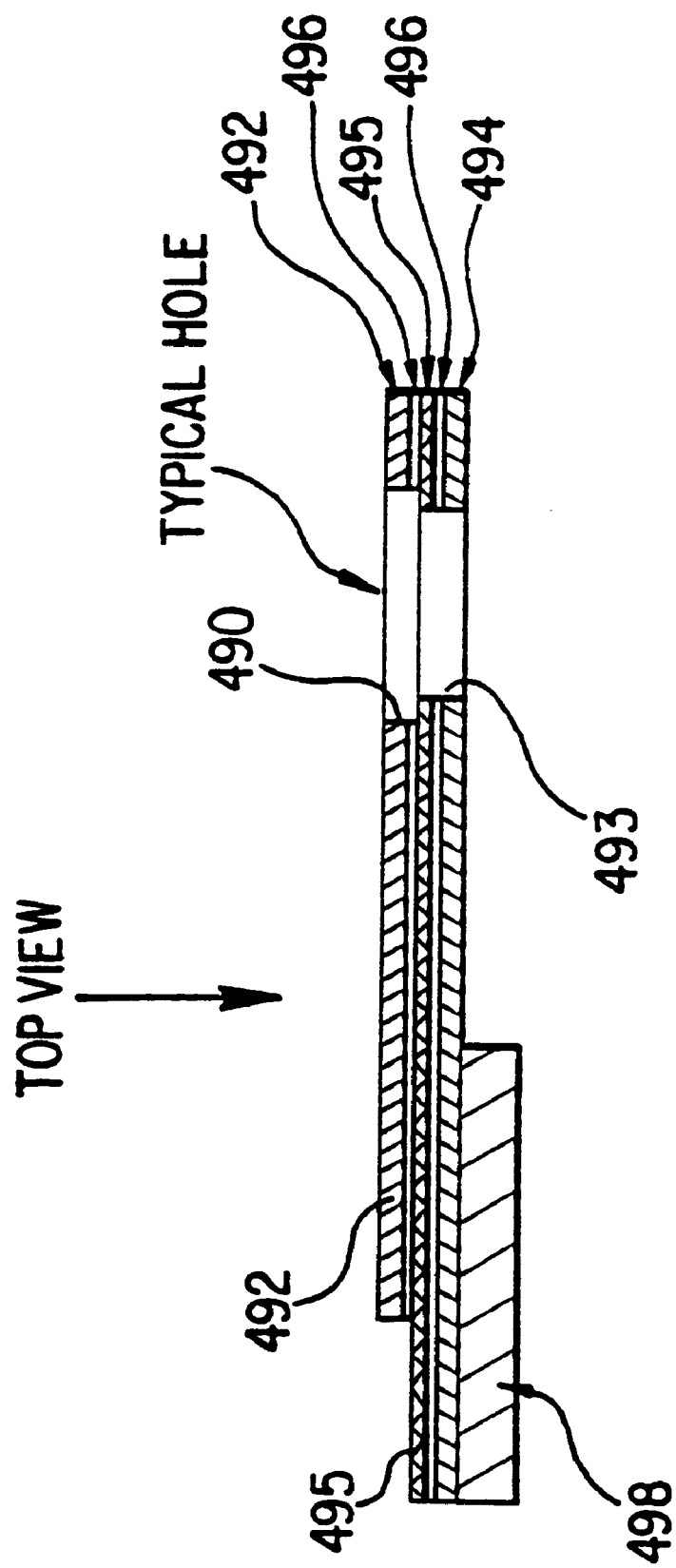
FIG. 23 is an enlarged sectional view showing an exemplary through-hole for the co-planar junction portion

The specification details of the flex-circuit member and its co-planar junction are shown in FIGS. 21–23, and are self explanatory. It is noted that the co-planar junction 452 is wider than the rest of the TAB circuit to allow sufficient space for a pair of solder connections 480 for a blue light LED, a pair of solder connections 482 for a green light LED, and a set of three solder connections 484 for the photocell. A first activation line 486 connects the blue light LED and a second separate activation line 488 connects the green light LED to allow independent control over the LEDs depending on the media markings. It is noted that in this particular embodiment, the green light LED is used to sense media markings made by black, or cyan, or magenta ink, while the blue light LED is used to sense media markings made by yellow ink.

The details of the through-holes in the junction portion are shown in FIG. 23, with an enlarged diameter upper hole 490 through a polyimide coverlay 492 and an smaller diameter lower hole 493 through a polyimide base 494 and a copper conductor layer 495. Acrylic adhesive layers 496 provide the required lamination for the TAB circuit. A small bottom stiffener layer 498 provides support for exposed ends of the conductors to be connected to a carriage circuit board such as through a zif connector.

Figure 24:
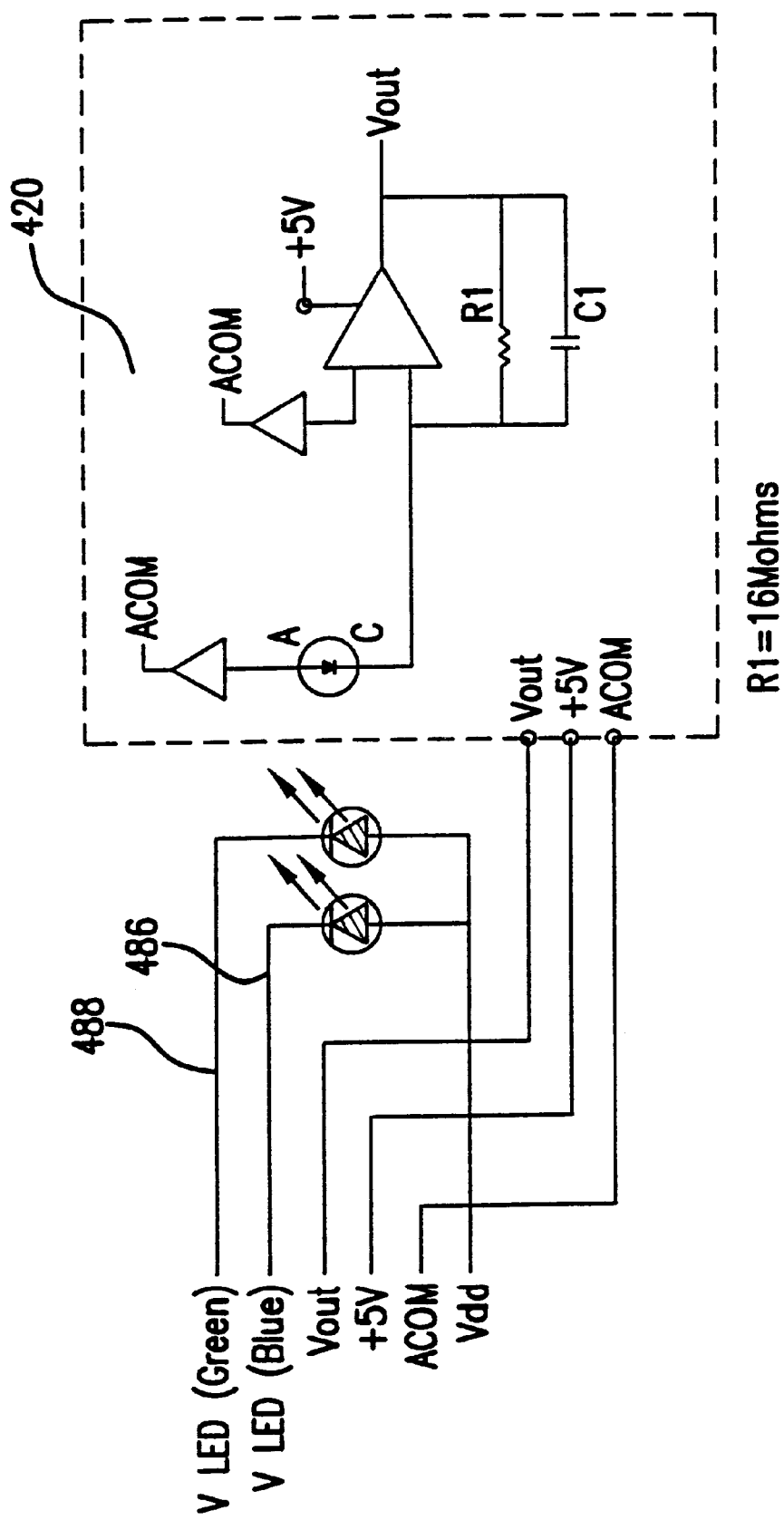
FIG. 24 is a schematic representation showing the interconnection between the circuitry interconnections between the flex-circuit and the photocell.

The circuitry for both the photocell 420 (with amplifier) as well as for the green light and blue light LEDs is shown schematically in FIG. 24.

Figure 25A:
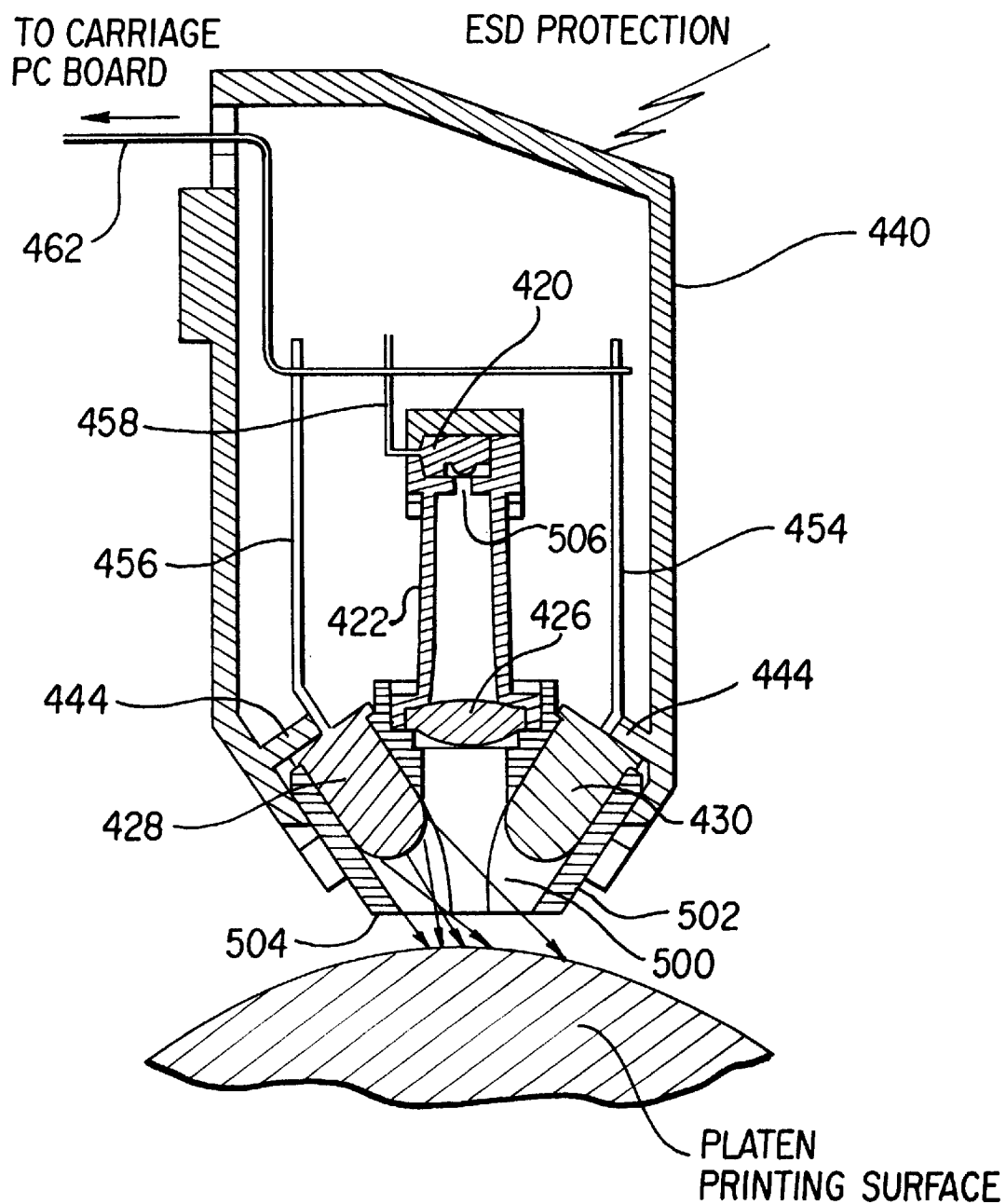
FIG. 25A is a cross-sectional view showing the optical sensor unit with light rays from one of the two LEDs illuminating a portion of the platen.
Figure 25B:
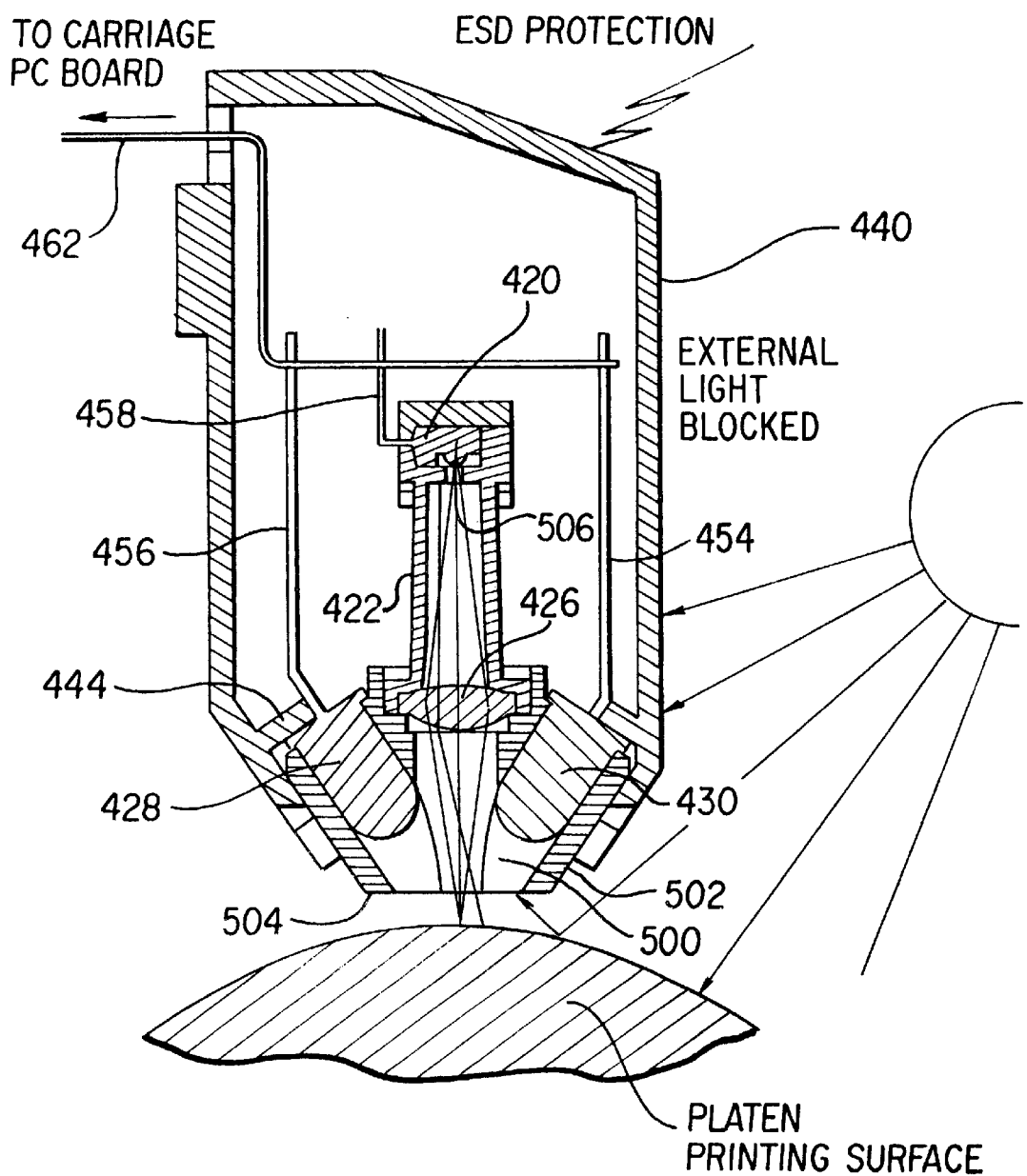
FIG. 25B is a cross-section view like FIG. 25A, but which shows the optical sensor unit with light rays being reflected from a portion of the platen through a lens to the photocell.

FIG. 25A shows the path of light emitted from one LED as the light is transmitted through the inside passageway of the light tube to the platen. FIG. 25B shows the path of light reflected back from the platen through the lens to the optical sensor. The inner walls 500 of the light tube help to focus the transmitted light in an area surrounding a point centrally located under the optical sensor, while the outer walls 502 of the light tube help to block excessive external light from being reflected from the platen up to the photocell. The lower end 504 of the light tube (i.e., cap) is preferably positioned in close proximity to the platen.

One of the features of the invention is the unitary construction of the light tube which provides both optical and structural benefits. In that regard, although there may be other smooth plastic-like materials which are suitable, the light tube selected for use in the preferred embodiment was made from a poly-carbonate material.

There is an abrupt inner diameter change at the upper end of the passageway leading to the photocell, from approximately 3.5 mm to 1.5 mm, leaving a 1 mm ledge which defines a protective aperture 506 leading to the photocell, in order to screen out as much as possible as indirectly reflected light so that the photocell will primarily measure light directly reflected from the central platen point under the optical sensor.

FIG. 26 shows some exemplary data taken for various distances from the bottom of the cap to the platen, showing that the optical system of the present invention can operate to accurately measure the print contrast ratio (PCR) despite variations which increase or decrease the preferred 2 mm distance.

The formula for calculating the PCR from the data shown in FIG. 26 is:

$$PCR = \frac{Vwhite - Vmin}{Vwhite - Vdk}$$

Figure 27:
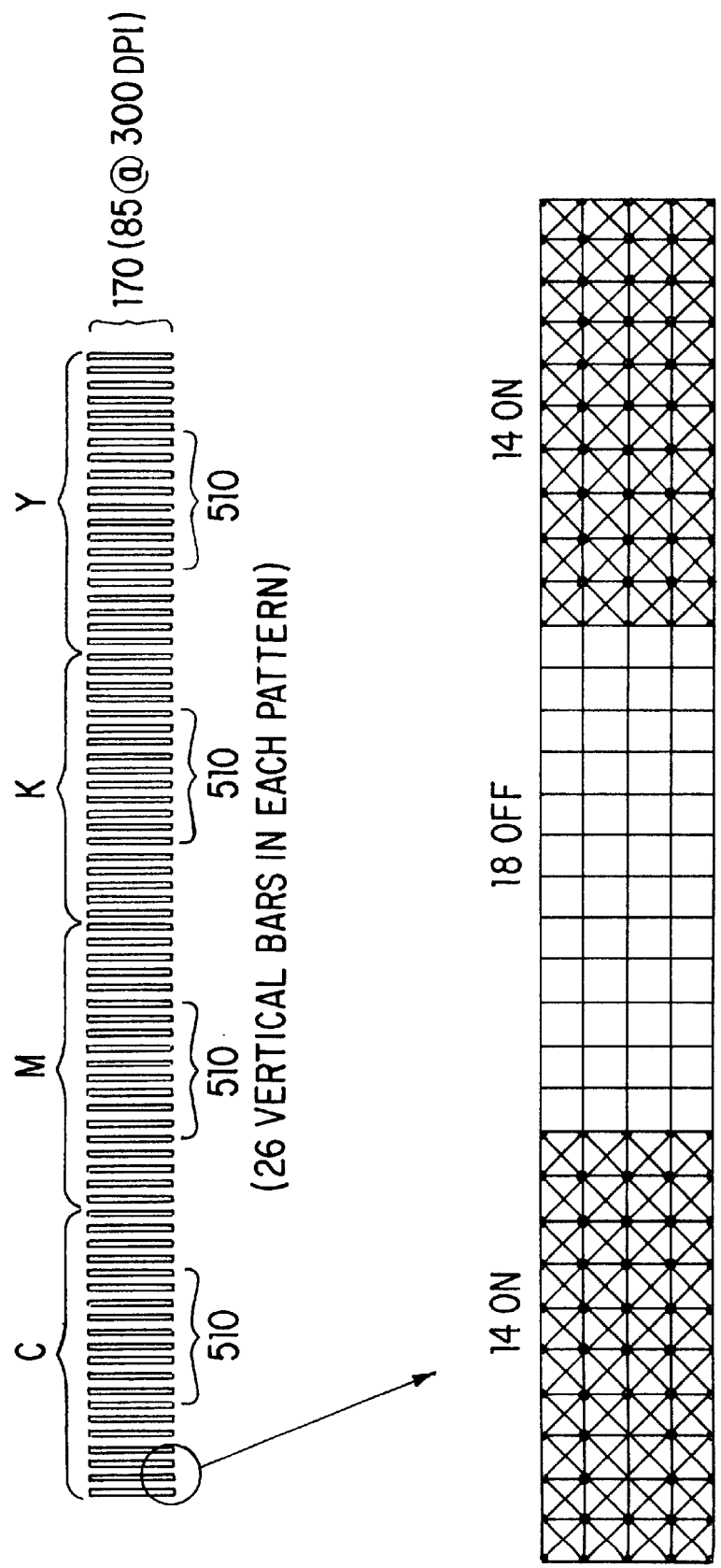
FIG. 27 is a schematic showing the test pattern used for determining relative printhead alighment in the Y-axis.

Vwhite=sensor voltage output for white reflection
Vmin=sensor voltage output for minimum reflection
Vdk=sensor voltage output for absolute darkness FIG. 27 shows how a sample pattern is printed in order to provide a basis for determining Y axis printhead offsets between C, M, K and Y nozzle arrays. In the preferred form, the width of each bar is 14 pixels on a 600 dpi grid and the white space between bars is 18 pixels, while the preferred length of each bar is 170 pixels on a 600 dpi grid. The Y axis alignment patterns are scanned in a routine which obtains samples at 600 samples/inch from the centered half portion 510 of each different color C M K Y alignment pattern (i.e., the 13 central bars). The number of samples read across each vertical bar is 416.

Figure 28:
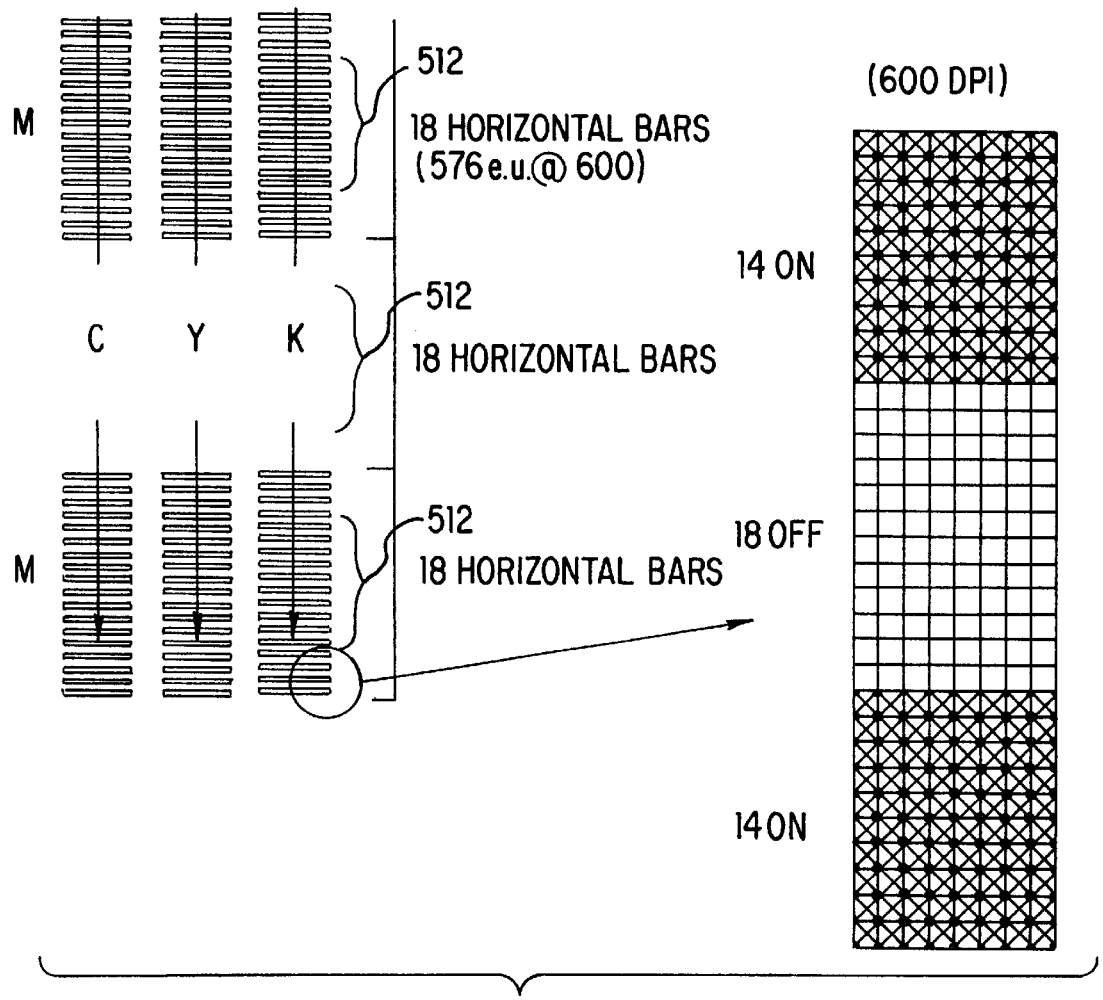
FIG. 28 is a schematic showing the test pattern used for determining relative printhead alignment in the X-axis.
Figure 29:
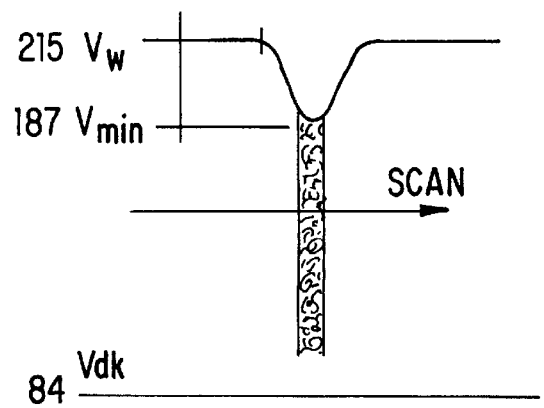
FIG. 29 is an exemplary curve of the type generated by the photocell.

Similarly, FIG. 28 shows how a sample pattern is printed in order to provide a basis for determining X axis printhead offsets between C, M, K and Y nozzle arrays. In the preferred form, the actual relative width of each bar and white space is the same as for the Y axis sample patterns. But the C, K, and Y sample patterns (shown as blank bars in FIG. 28 to distinguish them from the magenta bar pattern) are each preceded by a pattern of M bars, since in the preferred form all of the relative alignment spacings are measured from the position of the magenta printhead. The magenta bar pattern is repeated again after each separate C K Y pattern in order to provide a basis for determining paper advance error.

The X axis alignment patterns are scanned in a routine which obtains samples at 600 samples/inch from the centered two-thirds portion 512 of each different ink color alignment pattern (i.e., the 12 central bars). The number of samples read across each horizontal bar is 384.

It has been found satisfactory to print the sample bars at a resolution of 300 dpi and then scan the bars in a direction normal to the bar every 1/600th of an inch in order to generate data which will provide for correction in the Y axis in 1/600 inch increments.

The scanning speed is 6 inches/sec and uses the green LED for scanning the K, C and M patterns, and the blue LED for scanning the Y patterns.

Even though the sample bars are generated by raster printing, the technique of passing the sensor across the "line" to obtain the V-white and V-min readings is substantially the same technique used in the first pen plotter embodiment for obtaining the PCR date for vector lines drawn by a color pen.

It should be understood that the foregoing description is only illustrative of the invention. Various alternatives and modifications will be understood and developed by those skilled in the art without departing from the spirit of the invention. According, the present invention is intended to include all such alternatives, modifications and variations which fall within the scope of the following claims.

What is claimed is:

1. Apparatus for sensing calibration test patterns formed by different color markings applied to media by an inkjet printer/plotter, comprising:

a plurality of inkjet printheads, each capable of applying a different color ink to media;

a carriage member for holding said inkjet printheads in a predetermined position relative to said media as said carriage member moves relative to said media; and an optical sensor mounted on said carriage member and spaced apart from said media for sensing the quality of sample color markings applied to said media while the media remains in the printer/plotter by measuring a change in intensity of reflected light as the optical sensor passes crosswise over a plurality of different locations on sample lines or sample bars in a direction substantially normal to said sample lines or sample bars, said optical sensor incorporating a light tube for transmitting light to the sample color markings such that measurement of reflected light transmitted through the light tube from a separate test pattern of each different printhead can be used for alignment calibration between printheads of different color inks.

2. The apparatus of claim 1 wherein said inkjet printheads include printheads with ink taken from the group of cyan, magenta, yellow, black, red, blue and green.

3. The apparatus of claim 2 wherein said inkjet printheads include printheads with cyan, magenta, yellow and black ink.

4. The apparatus of claim 1 wherein said optical sensor includes at least one light source mounted on said carriage member to direct light in an angular direction relative to a top surface of media upon which said printheads apply ink.

5. The apparatus of claim 4 wherein said carriage member traverses in a carriage scan direction, and wherein said optical sensor is mounted in approximate alignment with said inkjet printheads in said carriage scan direction.

6. The apparatus of claim 4 which further includes at least two of said light sources.

7. The apparatus of claim 4 which further includes at least two different colored light sources.

8. The apparatus of claim 7 wherein said different colored light sources are taken from the group of red, green and blue lights.

9. The apparatus of claim 7 wherein said different colored light sources include a green LED and a blue LED.

10. The apparatus of claim 9 wherein said green LED is used for sensing ink markings from the group of magenta, cyan and black ink.

11. The apparatus of claim 9 wherein said blue LED is used for sensing ink markings of yellow ink.

12. The apparatus of claim 1 wherein said inkjet printheads print a pattern of one or more horizontal lines or bars.

13. The apparatus of claim 12 wherein said optical sensor passes over said horizontal lines or bars for sensing relative alignment between said inkjet printheads in a media-advance direction.

14. The apparatus of claim 1 wherein said inkjet printheads print a pattern of one or more vertical lines or bars.

15. The apparatus of claim 14 wherein said optical sensor passes over said vertical lines or bars for sensing relative alignment between said inkjet printheads in a carriage-scan direction.

16. The apparatus of claim 15 wherein said optical sensor passes over a plurality of vertical lines or bars of the same color ink and takes optical samples from a central portion of said vertical lines or bars.

17. The apparatus of claim 13 wherein said optical sensor passes over a plurality of horizontal lines or bars of the same color ink and takes optical samples from a central portion of said horizontal lines or bars.

18. A method of sensing calibration test patterns made by multiple inkjet printheads on an inkjet printer carriage, comprising the following;

applying linear markings to a calibration test pattern on media by moving said carriage across media in a print zone to create a separate test pattern for each printhead;

passing a carriage-mounted optical sensor crosswise over said linear markings in a direction substantially normal to said linear markings at a plurality of different locations on the test pattern in order to achieve alignment calibration between printheads of different color inks;

transmitting light from a carriage-mounted light source toward an area surrounding the markings;

directing some of the light from said transmitting from an inner wall portion of a carriage-mounted light tube;

reflecting light from the area surrounding the markings through a passageway to a carriage-mounted photocell; and measuring a change intensity of reflected light received by the photocell.

19. The method of claim 18 which further includes blocking off a portion of external light from the area surrounding the markings.

20. The method of claim 18 which further includes positioning the inner wall portion of the carriage-mounted light tube in close proximity to the media.

21. The method of claim 19 which further includes positioning an outer wall portion of the carriage-mounted light tube in close proximity to the media for blocking off a portion of external light from the area surrounding the markings.

22. The method of claim 18 wherein said passing step includes passing a carriage-mounted optical sensor of the markings in the print zone.

23. An inkjet printing system for alignment of printheads having different color inks, comprising:

a carriage for mounting the printheads in a swath printer;

a predetermined linear pattern of lines or bars printed from each printhead on the media to form a separate test pattern for each printhead;

a sensor unit mounted on said carriage and spaced apart from the media for traversing crosswise over said linear pattern, said sensor unit incorporating a light tube for transmitting light to said linear pattern and for receiving reflected light from said test pattern without removing the media from the printer in order to achieve alignment calibration between printheads of different color inks, having
- at least one light source emitting color light on said lines or bars;
- a photocell for sensing the relative position of said printheads by monitoring light intensity changes acress said lines or bars; and
- a support member for holding said at least one light source in a position for transmitting said color light in an angular direction toward said lines or bars.

24. The inkjet printing system of claim 23 which further includes a light tube for controlling the direction of emitted from said at least one light source.

25. The inkjet printing system of claim 23 wherein said light source includes at least two LEDs each emitting different colored light.

26. The inkjet printing system of claim 23 which further includes a protective aperture adjacent to said photocell to screen out indirect light reflected from said lines or bars.

27. The inkjet printing system of claim 23 wherein said bars are formed in a repeated pattern with a separation distance between adjacent bars greater than a width distance of each bar.

* * * * *